(12) United States Patent
De et al.

(10) Patent No.: US 11,329,943 B2
(45) Date of Patent: May 10, 2022

(54) WIRELESS NETWORK RELIABILITY OVER RELATIVELY LOW-POWER PROTOCOLS

(71) Applicant: Google Inc., Mountain View, CA (US)

(72) Inventors: Pradip De, Fremont, CA (US); Jay D. Logue, San Jose, CA (US)

(73) Assignee: Google LLC, Mountain View, CA (US)

( * ) Notice: Subject to any disclaimer, the term of this patent is extended or adjusted under 35 U.S.C. 154(b) by 772 days.

(21) Appl. No.: 14/971,873

(22) Filed: Dec. 16, 2015

(65) Prior Publication Data

US 2016/0182432 A1 Jun. 23, 2016

Related U.S. Application Data

(60) Provisional application No. 62/093,275, filed on Dec. 17, 2014.

(51) Int. Cl.
| | | |
|---|---|---|
| H04L 12/58 | (2006.01) | |
| H04L 51/23 | (2022.01) | |
| H04L 69/28 | (2022.01) | |
| H04L 12/28 | (2006.01) | |
| H04L 69/18 | (2022.01) | |
| H04L 69/22 | (2022.01) | |

(52) U.S. Cl.
CPC .......... *H04L 51/30* (2013.01); *H04L 12/2803* (2013.01); *H04L 69/18* (2013.01); *H04L 69/22* (2013.01); *H04L 69/28* (2013.01)

(58) Field of Classification Search
CPC .................................................. H04L 51/30
USPC ......................................................... 709/204
See application file for complete search history.

(56) References Cited

U.S. PATENT DOCUMENTS

| | | | |
|---|---|---|---|
| 6,112,323 A | 8/2000 | Meizlik et al. | |
| 7,191,075 B2 * | 3/2007 | Shimizu | A61B 5/0002 600/300 |
| 2003/0135639 A1 | 7/2003 | Marejka et al. | |
| 2006/0179147 A1 * | 8/2006 | Tran | G06F 11/2012 709/227 |
| 2008/0086560 A1 * | 4/2008 | Monier | G01D 4/004 709/224 |
| 2009/0319851 A1 | 12/2009 | Li | |
| 2010/0141415 A1 * | 6/2010 | Power | G08B 21/06 340/439 |
| 2013/0084896 A1 * | 4/2013 | Barkie | H04W 12/02 455/466 |
| 2013/0215755 A1 | 8/2013 | Liu et al. | |

(Continued)

FOREIGN PATENT DOCUMENTS

WO 2012-136455 A1 10/2012

OTHER PUBLICATIONS

International Search Report & Written Opinion for PCT Application No. PCT/US2016/06647 dated Apr. 5, 2016, p. 12 pgs.

*Primary Examiner* — Sibte H Bukhari
(74) *Attorney, Agent, or Firm* — Colby Nipper PLLC

(57) ABSTRACT

Systems and methods relating to communication over relatively low power protocols by adding reliability functionality are presented. Sent messages having reliability functionality include an acknowledgment request flag that indicates that the message includes a request to acknowledge the request once received and an application payload that includes data for the message. The acknowledgment request flag causes responding devices to send an acknowledgment message to the sending device indicating that the sent message has been received.

20 Claims, 10 Drawing Sheets

(56) References Cited

U.S. PATENT DOCUMENTS

| | | | |
|---|---|---|---|
| 2015/0163412 A1* | 6/2015 | Holley | G05B 15/02 |
| | | | 348/143 |
| 2016/0150474 A1* | 5/2016 | Ang | H04W 52/0216 |
| | | | 370/311 |
| 2016/0165663 A1* | 6/2016 | Shanmugam | H04W 76/10 |
| | | | 370/338 |

* cited by examiner

WIRELESS NETWORK RELIABILITY OVER RELATIVELY LOW-POWER PROTOCOLS

CROSS-REFERENCE TO RELATED APPLICATIONS

This application claims the benefit of Provisional Application Ser. No. 62/093,275, filed Dec. 17, 2014, entitled "Reliable Messaging In A Low-Power Wireless Network," which is incorporated by reference herein in its entirety.

BACKGROUND

This disclosure relates to a fabric network that couples electronic devices using one or more network types. Specifically, this disclosure relates to dynamically requesting and/or receiving acknowledgment messages.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Network-connected devices appear throughout homes. Some of these devices are often capable of communicating with each other through one or more networks using a reliable transfer protocol (e.g., TCP/IP). However, these protocols may have relatively high overhead in exchange for their reliability features. In the alternative, these devices may communicate using datagrams without reliability features (e.g., confirmations). However, these datagram communications may not be appropriate when certain communication types are used that preferably include a response.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems and methods for providing reliability support to datagram messages. As previously discussed, datagrams generally have low overhead, but datagrams typically do not have reliability functionality. Accordingly, to provide reliability functionality, reliability functionality may be imposed at a higher layer (e.g., application layer) of an OSI stack.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
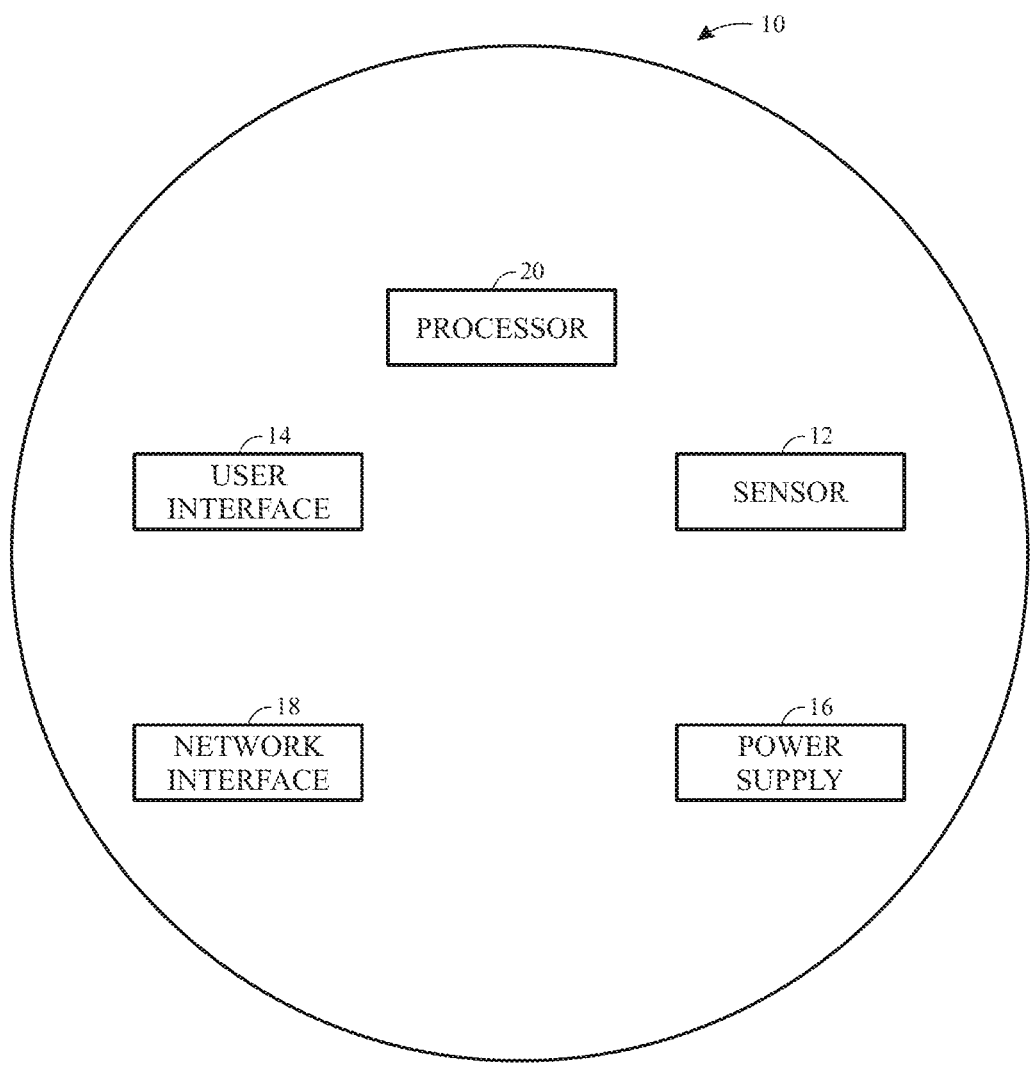
FIG. 1 is a block diagram of an electronic device having that may be interconnected with other devices using a fabric network, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate generally to an efficient fabric network that may be used by devices and/or services communicating with each other in a home environment. Generally, consumers living in homes may find it useful to coordinate the operations of various devices within their home such that all of their devices are operated efficiently. For example, a thermostat device may be used to detect a temperature of a home and coordinate the activity of other devices (e.g., lights) based on the detected temperature. In this example, the thermostat device may detect a temperature that may indicate that the temperature outside the home corresponds to daylight hours. The thermostat device may then convey to the light device that there may be daylight available to the home and that thus the light should turn off.

In addition to operating these devices efficiently, consumers generally prefer to use user-friendly devices that involve a minimum amount of set up or initialization. That is, consumers may generally prefer to purchase devices that are fully operational after performing a few number initialization steps that may be performed by almost any individual regardless of age or technical expertise.

With the foregoing in mind, to enable to effectively communicate data between each other within the home environment, the devices may use a fabric network that includes one or more logical networks to manage communication between the devices. That is, the efficient fabric network may enable numerous devices within a home to communicate with each other using one or more logical networks. The communication network may support Internet Protocol version 6 (IPv6) communication such that each connected device may have a unique local address (LA). Moreover, to enable each device to integrate with a home, it may be useful for each device to communicate within the network using low amounts of power. That is, by enabling devices to communicate using low power, the devices may be placed substantially anywhere in a home without being coupled to a continuous power source (e.g., battery-powered). However, these devices may also be sleepy devices and low power communication protocols may lack reliability functionality that may be advantageous for use in networks with sleepy devices. Thus, higher OSI layers may add reliability functionality on top of the underlying low power protocols.

I. Fabric Introduction

By way of introduction, FIG. 1 illustrates an example of a general device 10 that may that may communicate with other like devices within a home environment. In one embodiment, the device 10 may include one or more sensors 12, a user-interface component 14, a power supply 16 (e.g., including a power connection and/or battery), a network interface 18, a processor 20, and the like. Particular sensors 12, user-interface components 14, and power-supply configurations may be the same or similar with each devices 10. However, it should be noted that in some embodiments, each device 10 may include particular sensors 12, user-interface components 14, power-supply configurations, and the like based on a device type or model.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with a single sensor, many embodiments may include multiple sensors. In some instances, the device 10 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more user-interface components 14 in the device 10 may receive input from the user and/or present information to the user. The user-interface component 14 may also include one or more user-input components that may receive information from the user. The received input may be used to determine a setting. In certain embodiments, the user-input components may include a mechanical or virtual component that responds to the user's motion. For example, the user can mechanically move a sliding component (e.g., along a vertical or horizontal track) or rotate a rotatable ring (e.g., along a circular track), the user's motion along a touchpad may be detected, or motions/gestures may be detected using a contactless gesture detection sensor (e.g., infrared sensor or camera). Such motions may correspond to a setting adjustment, which can be determined based on an absolute position of a user-interface component 104 or based on a displacement of a user-interface components 104 (e.g., adjusting a setpoint temperature by 1 degree F. for every 10° rotation of a rotatable-ring component). Physically and virtually movable user-input components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-input component may be associated with a magnitude of a setting adjustment, such that a user may dramatically alter a setting with a large movement or finely tune a setting with s small movement.

The user-interface components 14 may also include one or more buttons (e.g., up and down buttons), a keypad, a number pad, a switch, a microphone, and/or a camera (e.g., to detect gestures). In one embodiment, the user-input component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-input component 14 may include a camera that may detect gestures (e.g., to indicate that a power or alarm state of a device is to be changed). In some instances, the device 10 may have one primary input component, which may be used to set various types of settings. The user-interface components 14 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available. In certain embodiments, the power supply component 16 may include intermittent or reduced power connections that may be less than that provided via an AC plug in the home. In certain embodiments, devices with batteries and/or intermittent or reduced power may be operated as "sleepy devices" that alternate between an online/awake state and an offline/sleep state to reduce power consumption.

The network interface 18 may include one or more components that enable the device 10 to communicate between devices using one or more logical networks within the fabric network. In one embodiment, the network interface 18 may communicate using an efficient network layer as part of its Open Systems Interconnection (OSI) model. In certain embodiments, one component of the network interface 18 may communicate with one logical network (e.g., WiFi) and another component of the network interface may communicate with another logical network (e.g., 802.15.4). In other words, the network interface 18 may enable the device 10 to wirelessly communicate via multiple IPv4 and/or IPv6 networks. As such, the network interface 18 may include a wireless card, Ethernet port, and/or other suitable transceiver connections.

The processor 20 may support one or more of a variety of different device functionalities. As such, the processor 20 may include one or more processors configured and programmed to carry out and/or cause to be carried out one or more of the functionalities described herein. In one embodiment, the processor 20 may include general-purpose processors carrying out computer code stored in local memory (e.g., flash memory, hard drive, random access memory), special-purpose processors or application-specific integrated circuits, other types of hardware/firmware/software processing platforms, and/or some combination thereof. Further, the processor 20 may be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, the processor 20 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 20 may include image recognition technology to identify particular occupants or objects.

In some instances, the processor 20 may predict desirable settings and/or implement those settings. For example, based on presence detection, the processor 20 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 20 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influences actions of a second device using one or more common profiles between the devices. For example, a first device can detect that a user has pulled into a garage (e.g., by detecting motion in the garage, detecting a change in light in the garage or detecting opening of the garage door). The first device can transmit this information to a second device via the fabric network, such that the second device can, e.g., adjust a home temperature setting, a light setting, a music setting, and/or a security-alarm setting. As another example, a first device can detect a user approaching a front door (e.g., by detecting motion or sudden light pattern changes). The first device may cause a general audio or visual signal to be presented (e.g., such as sounding of a doorbell) or cause a location-specific audio or visual signal to be presented (e.g., to announce the visitor's presence within a room that a user is occupying).

Figure 2:
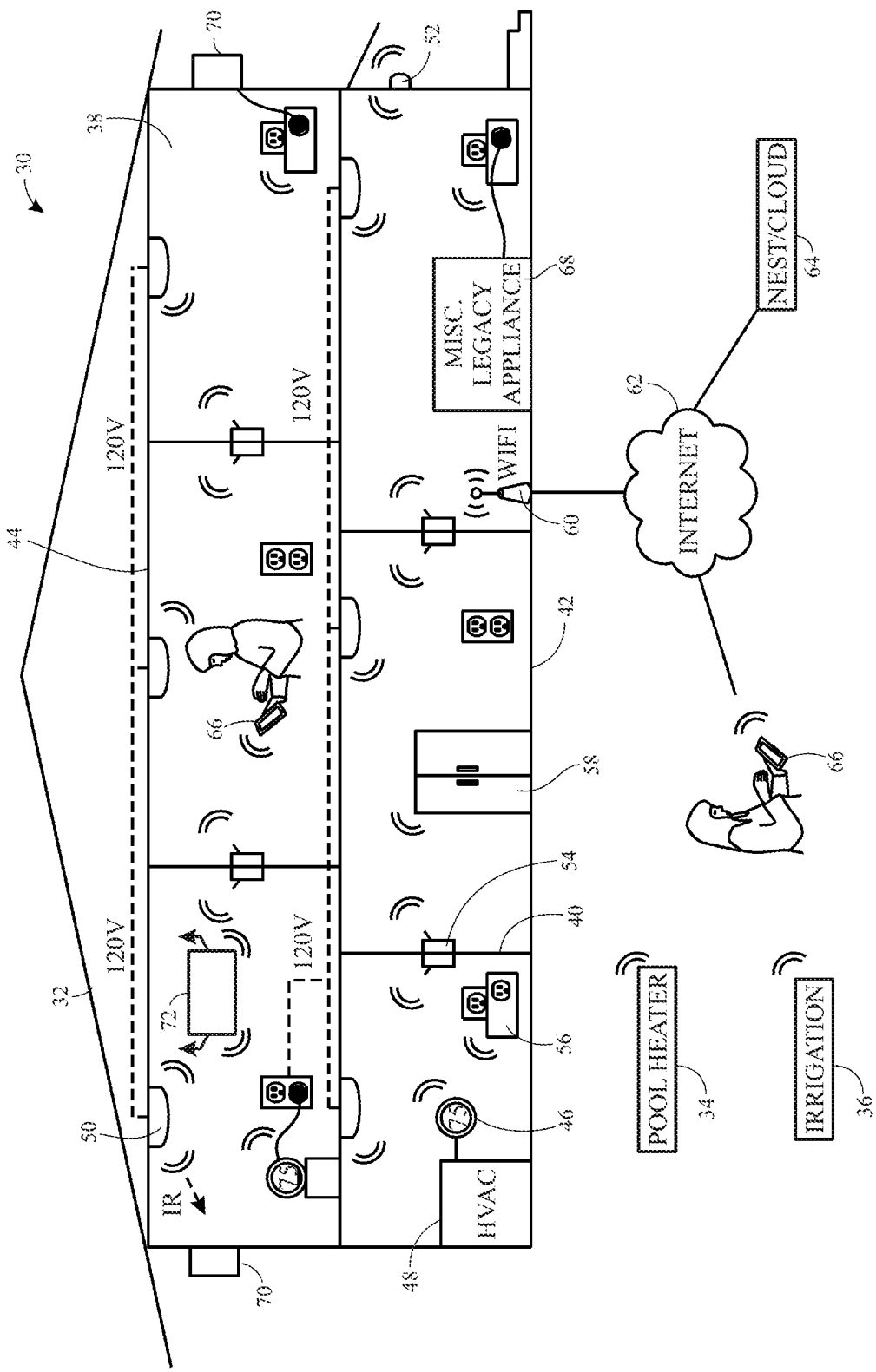
FIG. 2 illustrates a block diagram of a home environment in which the general device of FIG. 1 may communicate with other devices via the fabric network, in accordance with an embodiment.

With the foregoing in mind, FIG. 2 illustrates a block diagram of a home environment 30 in which the device 10 of FIG. 1 may communicate with other devices via the fabric network. The depicted home environment 30 may include a structure 32 such as a house, office building, garage, or mobile home. It will be appreciated that devices can also be integrated into a home environment that does not include an entire structure 32, such as an apartment, condominium, office space, or the like. Further, the home environment 30 may control and/or be coupled to devices outside of the actual structure 32. Indeed, several devices in the home environment 30 need not physically be within the structure 32 at all. For example, a device controlling a pool heater 34 or irrigation system 36 may be located outside of the structure 32.

The depicted structure 32 includes multiple rooms 38, separated at least partly from each other via walls 40. The walls 40 can include interior walls or exterior walls. Each room 38 can further include a floor 42 and a ceiling 44. Devices can be mounted on, integrated with and/or supported by the wall 40, the floor 42, or the ceiling 44.

The home environment 30 may include multiple devices, including intelligent, multi-sensing, network-connected devices that may integrate seamlessly with each other and/or with cloud-based server systems to provide any of a variety of useful home objectives. One, more or each of the devices illustrated in the home environment 30 may include one or more sensors 12, a user interface 14, a power supply 16, a network interface 18, a processor 20 and the like.

Example devices 10 may include a network-connected thermostat 46 that may detect ambient climate characteristics (e.g., temperature and/or humidity) and control a heating, ventilation and air-conditioning (HVAC) system 48. Another example device 10 may include a hazard detection unit 50 that can detect the presence of a hazardous substance and/or a hazardous condition in the home environment 30 (e.g., smoke, fire, or carbon monoxide). Additionally, entryway interface devices 52, which can be termed a "smart doorbell", can detect a person's approach to or departure from a location, control audible functionality, announce a person's approach or departure via audio or visual means, or control settings on a security system (e.g., to activate or deactivate the security system).

In certain embodiments, the device 10 may include a light switch 54 that may detect ambient lighting conditions, detect room-occupancy states, and control a power and/or dim state of one or more lights. In some instances, the light switches 54 may control a power state or speed of a fan, such as a ceiling fan.

Additionally, wall plug interfaces 56 may detect occupancy of a room or enclosure and control supply of power to one or more wall plugs (e.g., such that power is not supplied to the plug if nobody is at home). The device 10 within the home environment 30 may further include an appliance 58, such as refrigerators, stoves and/or ovens, televisions, washers, dryers, lights (inside and/or outside the structure 32), stereos, intercom systems, garage-door openers, floor fans, ceiling fans, whole-house fans, wall air conditioners, pool heaters 34, irrigation systems 36, security systems, and so forth. While descriptions of FIG. 2 may identify specific sensors and functionalities associated with specific devices, it will be appreciated that any of a variety of sensors and functionalities (such as those described throughout the specification) may be integrated into the device 10.

In addition to containing processing and sensing capabilities, each of the example devices described above may be capable of data communications and information sharing with any other device, as well as to any cloud server or any other device that is network-connected anywhere in the world. In one embodiment, the devices 10 may send and receive communications via a fabric network discussed below. In one embodiment, fabric may enable the devices 10 to communicate with each other via one or more logical networks. As such, certain devices may serve as wireless repeaters and/or may function as bridges between devices, services, and/or logical networks in the home environment that may not be directly connected (i.e., one hop) to each other.

In one embodiment, a wireless router 60 may further communicate with the devices 10 in the home environment 30 via one or more logical networks (e.g., WiFi). The wireless router 60 may then communicate with the Internet 62 or other network such that each device 10 may communicate with a remote service or a cloud-computing system 64 through the Internet 62. The cloud-computing system 64 may be associated with a manufacturer, support entity or service provider associated with a particular device 10. As such, in one embodiment, a user may contact customer support using a device itself rather than using some other communication means such as a telephone or Internet-connected computer. Further, software updates can be automatically sent from the cloud-computing system 64 or devices in the home environment 30 to other devices in the fabric (e.g., when available, when purchased, when requested, or at routine intervals).

By virtue of network connectivity, one or more of the devices 10 may further allow a user to interact with the device even if the user is not proximate to the device. For example, a user may communicate with a device using a computer (e.g., a desktop computer, laptop computer, or tablet) or other portable electronic device (e.g., a smartphone) 66. A webpage or application may receive communications from the user and control the device 10 based on the received communications. Moreover, the webpage or application may present information about the device's operation to the user. For example, the user can view a current setpoint temperature for a device and adjust it using a computer that may be connected to the Internet 62. In this example, the thermostat 46 may receive the current setpoint temperature view request via the fabric network via one or more underlying logical networks.

In certain embodiments, the home environment 30 may also include a variety of non-communicating legacy appliances 68, such as old conventional washer/dryers, refrigerators, and the like which can be controlled, albeit coarsely (ON/OFF), by virtue of the wall plug interfaces 56. The home environment 30 may further include a variety of partially communicating legacy appliances 70, such as infrared (IR) controlled wall air conditioners or other IR-controlled devices, which can be controlled by IR signals provided by the hazard detection units 50 or the light switches 54.

Figure 3:
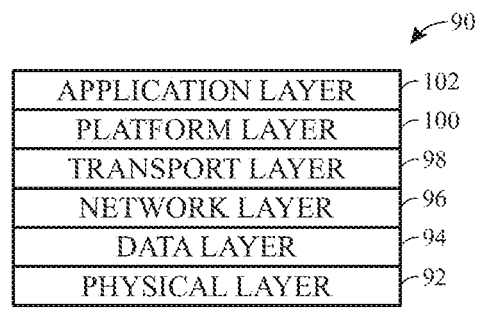
FIG. 3 illustrates a block diagram of an Open Systems Interconnection (OSI) model that characterizes a communication system for the home environment of FIG. 2, in accordance with an embodiment.

As mentioned above, each of the example devices 10 described above may form a portion of a fabric network. Generally, the fabric network may be part of an Open Systems Interconnection (OSI) model 90 as depicted in FIG. 3. The OSI model 90 illustrates functions of a communication system with respect to abstraction layers. That is, the OSI model may specify a networking framework or how communications between devices may be implemented. In one embodiment, the OSI model may include six layers: a physical layer 92, a data link layer 94, a network layer 96, a transport layer 98, a platform layer 100, and an application layer 102. Generally, each layer in the OSI model 90 may serve the layer above it and may be served by the layer below it.

Keeping this in mind, the physical layer 92 may provide hardware specifications for devices that may communicate with each other. As such, the physical layer 92 may establish how devices may connect to each other, assist in managing how communication resources may be shared between devices, and the like.

The data link layer 94 may specify how data may be transferred between devices. Generally, the data link layer 94 may provide a way in which data packets being transmitted may be encoded and decoded into bits as part of a transmission protocol.

The network layer 96 may specify how the data being transferred to a destination node is routed. The network layer 96 may also provide a security protocol that may maintain the integrity of the data being transferred. The efficient network layer discussed above corresponds to the network layer 96. In certain embodiments, the network layer 96 may be completely independent of the platform layer 100 and include any suitable network type (e.g., WiFi, Ethernet, HomePlug, 802.15.4, etc) that may transmit using IPv6 or IPv4 protocols.

The transport layer 98 may specify a transparent transfer of the data from a source node to a destination node. The transport layer 98 may also control how the transparent transfer of the data remains reliable. As such, the transport layer 98 may be used to verify that data packets intended to transfer to the destination node indeed reached the destination node. Example protocols that may be employed in the transport layer 98 may include Transmission Control Protocol (TCP) and User Datagram Protocol (UDP) or other suitable transport protocols.

The platform layer 100 includes the fabric network and establishes connections between devices according to the protocol specified within the transport layer 98 and may be agnostic of the network type used in the network layer 96. The platform layer 100 may also translate the data packets into a form that the application layer 102 may use. The application layer 102 may support a software application that may directly interface with the user. As such, the application layer 102 may implement protocols defined by the software application. For example, the software application may provide serves such as file transfers, electronic mail, and the like.

II. Fabric Device Interconnection

Figure 4:
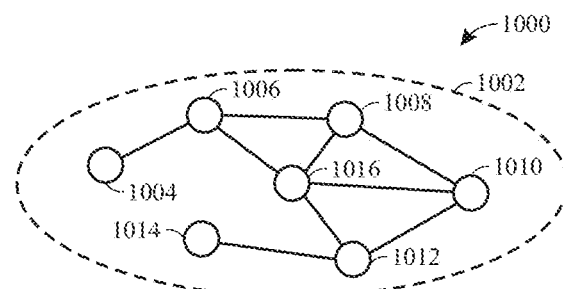
FIG. 4 illustrates the fabric network having a single logical network topology, in accordance with an embodiment.
Figure 5:
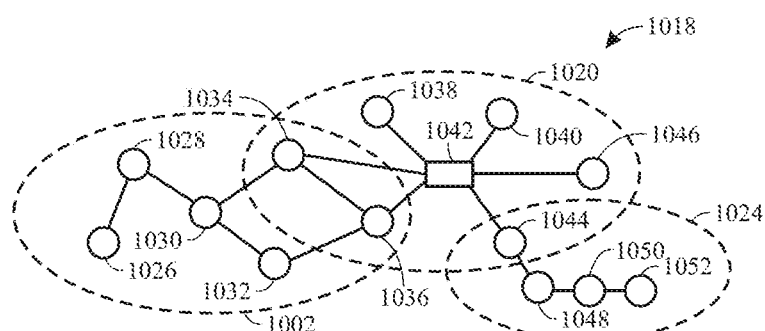
FIG. 5 illustrates the fabric network having a star network topology, in accordance with an embodiment.
Figure 6:
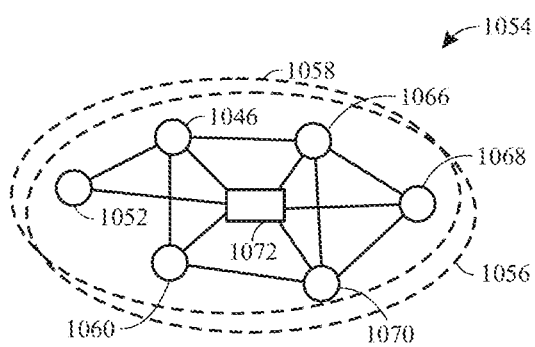
FIG. 6 illustrates the fabric network having an overlapping networks topology, in accordance with an embodiment.

As discussed above, a fabric may be implemented using one or more suitable communications protocols, such as IPv6 protocols. In fact, the fabric may be partially or completely agnostic to the underlying technologies (e.g., network types or communication protocols) used to implement the fabric. Within the one or more communications protocols, the fabric may be implemented using one or more network types used to communicatively couple electrical devices using wireless or wired connections. For example, certain embodiments of the fabric may include Ethernet, WiFi, 802.15.4, ZigBee®, ISA100.11a, WirelessHART, MiWi™, power-line networks, and/or other suitable network types. Within the fabric devices (e.g., nodes) can exchange packets of information with other devices (e.g., nodes) in the fabric, either directly or via intermediary nodes, such as intelligent thermostats, acting as IP routers. These nodes may include manufacturer devices (e.g., thermostats and smoke detectors) and/or customer devices (e.g., phones, tablets, computers, etc.). Additionally, some devices may be "always on" and continuously powered using electrical connections. Other devices may have partially reduced power usage (e.g., medium duty cycle) using a reduced/intermittent power connection, such as a thermostat or doorbell power connection. Finally, some devices may have a short duty cycle and run solely on battery power. In other words, in certain embodiments, the fabric may include heterogeneous devices that may be connected to one or more sub-networks according to connection type and/or desired power usage. FIGS. 4-6 illustrate three embodiments that may be used to connect electrical devices via one or more sub-networks in the fabric.

A. Single Network Topology

FIG. 4 illustrates an embodiment of the fabric 1000 having a single network topology. As illustrated, the fabric 1000 includes a single logical network 1002. The network 1002 could include Ethernet, WiFi, 802.15.4, power-line networks, and/or other suitable network types in the IPv4 or IPv6 protocols. In fact, in some embodiments where the network 1002 includes a WiFi or Ethernet network, the network 1002 may span multiple WiFi and/or Ethernet segments that are bridged at a link layer.

The network 1002 includes one or more nodes 1004, 1006, 1008, 1010, 1012, 1014, and 1016, referred to collectively as 1004-1016. Although the illustrated network 1002 includes seven nodes, certain embodiments of the network 1002 may include one or more nodes interconnected using the network 1002. Moreover, if the network 1002 is a WiFi network, each of the nodes 1004-1016 may be interconnected using the node 1016 (e.g., WiFi router) and/or paired with other nodes using WiFi Direct (i.e., WiFi P2P).

B. Star Network Topology

FIG. 5 illustrates an alternative embodiment of fabric 1000 as a fabric 1018 having a star network topology. The fabric 1018 includes a hub network 1020 that joins together two periphery networks 1022 and 1024. The hub network 1020 may include a home network, such as WiFi/Ethernet network or power line network. The periphery networks 1022 and 1024 may additional network connection types different of different types than the hub network 1020. For example, in some embodiments, the hub network 1020 may be a WiFi/Ethernet network, the periphery network 1022 may include an 802.15.4 network, and the periphery network 1024 may include a power line network, a ZigBee® network, a ISA100.11a network, a WirelessHART, network, or a MiWi™ network. Moreover, although the illustrated embodiment of the fabric 1018 includes three networks, certain embodiments of the fabric 1018 may include any number of networks, such as 2, 3, 4, 5, or more networks. In fact, some embodiments of the fabric 1018 include multiple periphery networks of the same type.

Although the illustrated fabric 1018 includes fourteen nodes, each referred to individually by reference numbers 1024-1052, respectively, it should be understood that the fabric 1018 may include any number of nodes. Communication within each network 1020, 1022, or 1024, may occur directly between devices and/or through an access point, such as node 1042 in a WiFi/Ethernet network. Communications between periphery network 1022 and 1024 passes through the hub network 1020 using inter-network routing nodes. For example, in the illustrated embodiment, nodes 1034 and 1036 are be connected to the periphery network 1022 using a first network connection type (e.g., 802.15.4) and to the hub network 1020 using a second network connection type (e.g., WiFi) while the node 1044 is connected to the hub network 1020 using the second network connection type and to the periphery network 1024 using a third network connection type (e.g., power line). For example, a message sent from node 1026 to node 1052 may pass through nodes 1028, 1030, 1032, 1036, 1042, 1044, 1048, and 1050 in transit to node 1052.

Furthermore, in some embodiments, as previously discussed, at least some of end nodes (e.g., node 1026) may be sleepy nodes that connect to one or more parent routers (e.g., node 1028) that are used to store messages while the sleepy nodes are in a sleep state.

C. Overlapping Networks Topology

FIG. 6 illustrates an alternative embodiment of the fabric 1000 as a fabric 1054 having an overlapping networks topology. The fabric 1054 includes networks 1056 and 1058. As illustrated, each of the nodes 1062, 1064, 1066, 1068, 1070, and 1072 may be connected to each of the networks. In other embodiments, the node 1072 may include an access point for an Ethernet/WiFi network rather than an end point and may not be present on either the network 1056 or network 1058, whichever is not the Ethernet/WiFi network. Accordingly, a communication from node 1062 to node 1068 may be passed through network 1056, network 1058, or some combination thereof. In the illustrated embodiment, each node can communicate with any other node via any network using any network desired. Accordingly, unlike the star network topology of FIG. 5, the overlapping networks topology may communicate directly between nodes via any network without using inter-network routing.

D. Fabric Network Connection to Services

Figure 7:
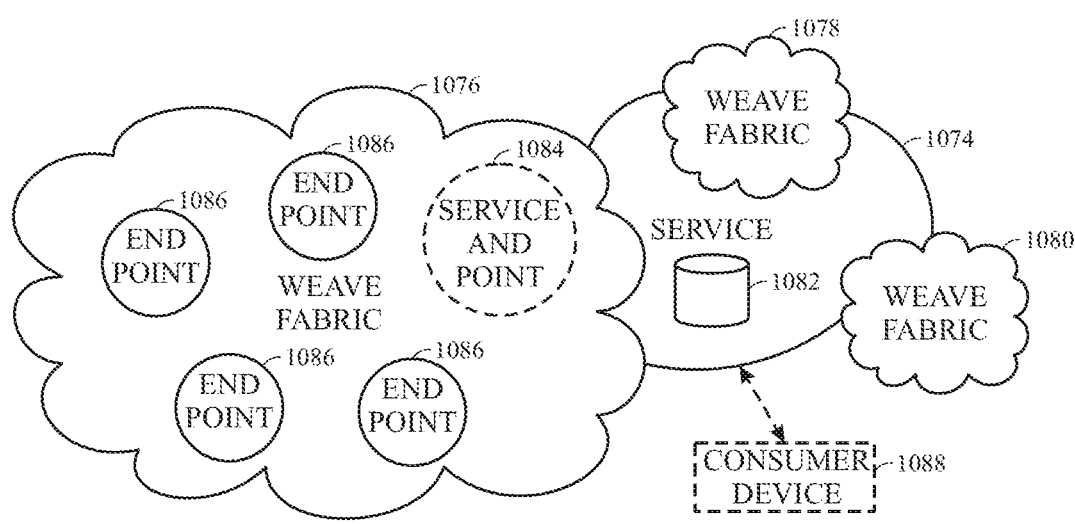
FIG. 7 illustrates a service communicating with one or more fabric networks, in accordance with an embodiment.

In addition to communications between devices within the home, a fabric (e.g., fabric 1000) may include services that may be located physically near other devices in the fabric or physically remote from such devices. The fabric connects to these services through one or more service end points. FIG. 7 illustrates an embodiment of a service 1074 communicating with fabrics 1076, 1078, and 1080. The service 1074 may include various services that may be used by devices in fabrics 1076, 1078, and/or 1080. For example, in some embodiments, the service 1074 may be a time of day service that supplies a time of day to devices, a weather service to provide various weather data (e.g., outside temperature, sunset, wind information, weather forecast, etc.), an echo service that "pings" each device, data management services, device management services, and/or other suitable services. As illustrated, the service 1074 may include a server 1082 (e.g., web server) that stores/accesses relevant data and passes the information through a service end point 1084 to one or more end points 1086 in a fabric, such as fabric 1076. Although the illustrated embodiment only includes three fabrics with a single server 1082, it should be appreciated that the service 1074 may connect to any number of fabrics and may include servers in addition to the server 1082 and/or connections to additional services.

In certain embodiments, the service 1074 may also connect to a consumer device 1088, such as a phone, tablet, and/or computer. The consumer device 1088 may be used to connect to the service 1074 via a fabric, such as fabric 1076, an Internet connection, and/or some other suitable connection method. The consumer device 1088 may be used to access data from one or more end points (e.g., electronic devices) in a fabric either directly through the fabric or via the service 1074. In other words, using the service 1074, the consumer device 1088 may be used to access/manage devices in a fabric remotely from the fabric.

E. Communication Between Devices in a Fabric

Figure 8:
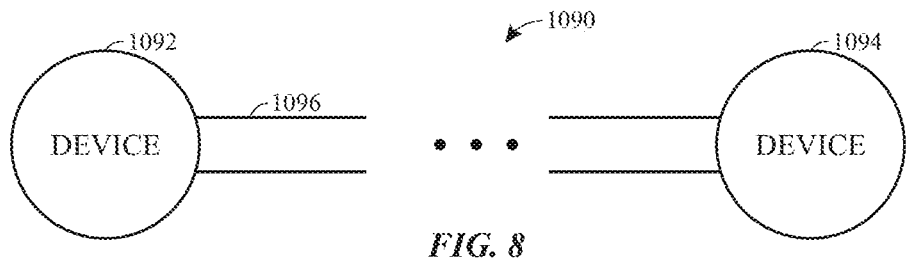
FIG. 8 illustrates two devices in a fabric network in communicative connection, in accordance with an embodiment.

As discussed above, each electronic device or node may communicate with any other node in the fabric, either directly or indirectly depending upon fabric topology and network connection types. Additionally, some devices (e.g., remote devices) may communicate through a service to communicate with other devices in the fabric. FIG. 8 illustrates an embodiment of a communication 1090 between two devices 1092 and 1094. The communication 1090 may span one or more networks either directly or indirectly through additional devices and/or services, as described above. Additionally, the communication 1090 may occur over an appropriate communication protocol, such as IPv6, using one or more transport protocols. For example, in some embodiments the communication 1090 may include using the transmission control protocol (TCP) and/or the user datagram protocol (UDP). In some embodiments, the device 1092 may transmit a first signal 1096 to the device 1094 using a connectionless protocol (e.g., UDP). In certain embodiments, the device 1092 may communicate with the device 1094 using a connection-oriented protocol (e.g., TCP). Although the illustrated communication 1090 is depicted as a bi-directional connection, in some embodiments, the communication 1090 may be a uni-directional broadcast (e.g., UDP with or without acknowledgment requests).

i. Unique Local Address

As discussed above, data transmitted within a fabric received by a node may be redirected or passed through the node to another node depending on the desired target for the communication. In some embodiments, the transmission of the data may be intended to be broadcast to all devices. In such embodiments, the data may be retransmitted without further processing to determine whether the data should be passed along to another node. However, some data may be directed to a specific endpoint. To enable addressed messages to be transmitted to desired endpoints, nodes may be assigned identification information.

Each node may be assigned a set of link-local addresses (LLA) and/or global addresses, with a LLA assigned to each network interface. These LLAs may be used to communicate with other nodes on the same network. Additionally, the LLAs may be used for various communication procedures, such as IPv6 Neighbor Discovery Protocol. In addition to LLAs, each node is assigned a unique local address (ULA).

Figure 9:
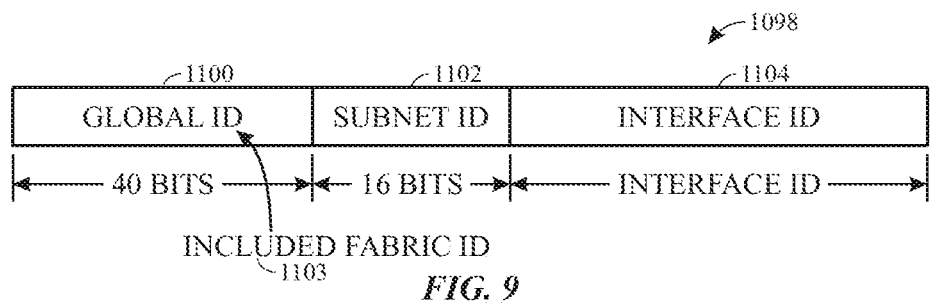
FIG. 9 illustrates a unique local address format (ULA) that may be used to address devices in a fabric network, in accordance with an embodiment.

FIG. 9 illustrates an embodiment of a unique local address (ULA) 1098 that may be used to address each node in the fabric. In certain embodiments, the ULA 1098 may be formatted as an IPv6 address format containing 128 bits divided into a global ID 1100, a subnet ID 1102, and an interface ID 1104. The global ID 1100 includes 40 bits and the subnet ID 1102 includes 16 bits. The global ID 1100 may be used as a part of a fabric ID 1103 for the fabric.

The fabric ID 1103 is a unique 64-bit identifier used to identify a fabric. The fabric ID 1103 may be generated at creation of the associated fabric using a pseudo-random algorithm. For example, the pseudo-random algorithm may 1) obtain the current time of day in 64-bit NTP format, 2) obtain the interface ID 1104 for the device, 3) concatenate the time of day with the interface ID 1104 to create a key, 4) compute and SHA-1 digest on the key resulting in 160 bits, 5) use the least significant 40 bits as the global ID 1100, and 6) concatenate the ULA and set the least significant bit to 1 to create the fabric ID 1103. In certain embodiments, once the fabric ID 1103 is created with the fabric, the fabric ID 1103 remains until the fabric is dissolved.

The global ID 1100 identifies the fabric to which the node belongs. The subnet ID 1102 identifies logical networks within the fabric. The subnet ID F3 may be assigned monotonically starting at one with the addition of each new logical network to the fabric. For example, a WiFi network may be identified with a hex value of 0x01, and a later connected 802.15.4 network may be identified with a hex value of 0x02 continuing on incrementally upon the connection of each new network to the fabric.

Finally, the ULA 1098 includes an interface ID 1104 that includes 64 bits. The interface ID 1104 may be assigned using a globally-unique 64-bit identifier according to the IEEE EUI-64 standard. For example, devices with IEEE 802 network interfaces may derive the interface ID 1104 using a burned-in MAC address for the devices "primary interface." In some embodiments, the designation of which interface is the primary interface may be determined arbitrarily. In other embodiments, an interface type (e.g., WiFi) may be deemed the primary interface, when present. If the MAC address for the primary interface of a device is 48 bits rather than 64-bit, the 48-bit MAC address may be converted to a EUI-64 value via encapsulation (e.g., organizationally unique identifier encapsulating). In consumer devices (e.g., phones or computers), the interface ID 1104 may be assigned by the consumer devices' local operating systems.

ii. Routing Transmissions Between Logical Networks

As discussed above in relation to a star network topology, inter-network routing may occur in communication between two devices across logical networks. In some embodiments, inter-network routing is based on the subnet ID 1102. Each inter-networking node (e.g., node 1034 of FIG. 5) may maintain a list of other routing nodes (e.g., node B 14 of FIG. 5) on the hub network 1020 and their respective attached periphery networks (e.g., periphery network 1024 of FIG. 5). When a packet arrives addressed to a node other than the routing node itself, the destination address (e.g., address for node 1052 of FIG. 5) is compared to the list of network prefixes and a routing node (e.g., node 1044) is selected that is attached to the desired network (e.g., periphery network 1024). The packet is then forwarded to the selected routing node. If multiple nodes (e.g., 1034 and 1036) are attached to the same periphery network, routing nodes are selected in an alternating fashion.

Additionally, inter-network routing nodes may regularly transmit Neighbor Discovery Protocol (NDP) router advertisement messages on the hub network to alert consumer devices to the existence of the hub network and allow them to acquire the subnet prefix. The router advertisements may include one or more route information options to assist in routing information in the fabric. For example, these route information options may inform consumer devices of the existence of the periphery networks and how to route packets the periphery networks.

Figure 10:
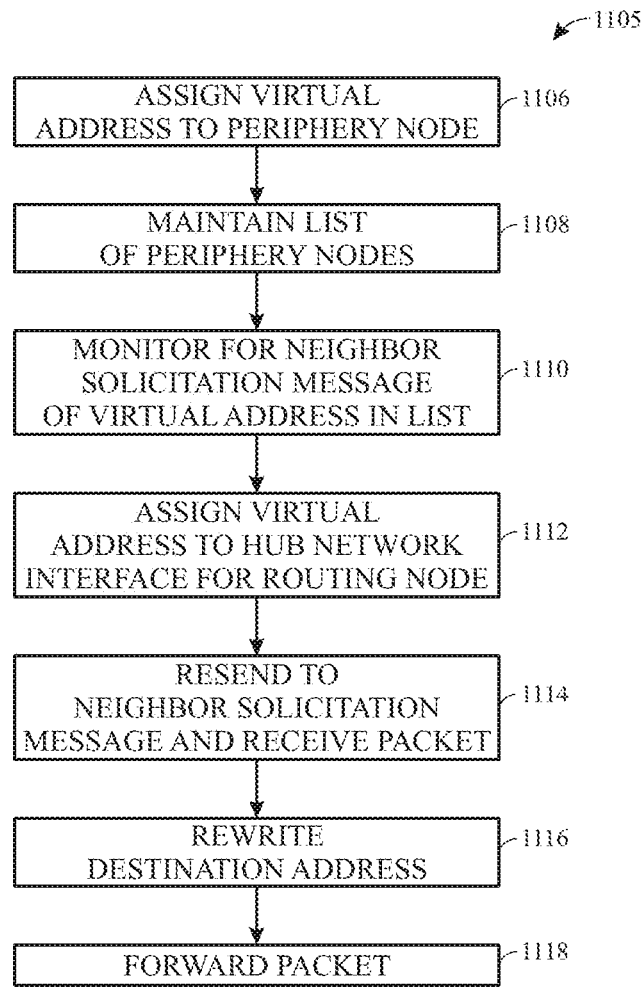
FIG. 10 illustrates a process for proxying periphery devices on a hub network, in accordance with an embodiment.

In addition to, or in place of route information options, routing nodes may act as proxies to provide a connection between consumer devices and devices in periphery networks, such as the process 1105 as illustrated in FIG. 10. As illustrated, the process 1105 includes each periphery network device being assigned a virtual address on the hub network by combining the subnet ID 1102 with the interface ID 1104 for the device on the periphery network (block 1106). To proxy using the virtual addresses, routing nodes maintain a list of all periphery nodes in the fabric that are directly reachable via one of its interfaces (block 1108). The routing nodes listen on the hub network for neighbor solicitation messages requesting the link address of a periphery node using its virtual address (block 1110). Upon receiving such a message, the routing node attempts to assign the virtual address to its hub interface after a period of time (block 1112). As part of the assignment, the routing node performs duplicate address detection so as to block proxying of the virtual address by more than one routing node. After the assignment, the routing node responds to the neighbor solicitation message and receives the packet (block 1114). Upon receiving the packet, the routing node rewrites the destination address to be the real address of the periphery node (block 1116) and forwards the message to the appropriate interface (block 1118).

A. Tag Length Value (TLV) Formatting

To reduce power consumption, it is desirable to send at least a portion of the data sent over the fabric that compactly while enabling the data containers to flexibly represents data that accommodates skipping data that is not recognized or understood by skipping to the next location of data that is understood within a serialization of the data. In certain embodiments, tag-length-value (TLV) formatting may be used to compactly and flexibly encode/decode data. By storing at least a portion of the transmitted data in TLV, the data may be compactly and flexibly stored/sent along with low encode/decode and memory overhead. In certain embodiments, TLV may be used for some data as flexible, extensible data, but other portions of data that is not extensible may be stored and sent in an understood standard protocol data unit (PDU).

Data formatted in a TLV format may be encoded as TLV elements of various types, such as primitive types and container types. Primitive types include data values in certain formats, such as integers or strings. For example, the TLV format may encode: 1, 2, 3, 4, or 8 byte signed/unsigned integers, UTF-8 strings, byte strings, single/double-precision floating numbers (e.g., IEEE 754-1985 format), boolean, null, and other suitable data format types. Container types include collections of elements that are then sub-classified as container or primitive types. Container types may be classified into various categories, such as dictionaries, arrays, paths or other suitable types for grouping TLV elements, known as members. A dictionary is a collection of members each having distinct definitions and unique tags within the dictionary. An array is an ordered collection of members with implied definitions or no distinct definitions. A path is an ordered collection of members that described how to traverse a tree of TLV elements.

Figure 11:
FIG. 11 illustrates a tag-length-value (TLV) packet that may be used to transmit data over the fabric network, in accordance with an embodiment.

As illustrated in FIG. 11, an embodiment of a TLV packet 1120 includes three data fields: a tag field 1122, a length field 1124, and a value field 1126. Although the illustrated fields 1122, 1124, and 1126 are illustrated as approximately equivalent in size, the size of each field may be variable and vary in size in relation to each other. In other embodiments, the TLV packet 1120 may further include a control byte before the tag field 1122.

In embodiments having the control byte, the control byte may be sub-divided into an element type field and a tag control field. In some embodiments, the element type field includes 5 lower bits of the control byte and the tag control field occupies the upper 3 bits. The element type field indicates the TLV element's type as well as the how the length field 1124 and value field 1126 are encoded. In certain embodiments, the element type field also encodes Boolean values and/or null values for the TLV. For example, an embodiment of an enumeration of element type field is provided in Table 1 below.

TABLE 1

Example element type field values.

| 7 | 6 | 5 | 4 | 3 | 2 | 1 | 0 | |
|---|---|---|---|---|---|---|---|---|
| | | | 0 | 0 | 0 | 0 | 0 | Signed Integer, 1 byte value |
| | | | 0 | 0 | 0 | 0 | 1 | Signed Integer, 2 byte value |
| | | | 0 | 0 | 0 | 1 | 0 | Signed Integer, 4 byte value |
| | | | 0 | 0 | 0 | 1 | 1 | Signed Integer, 8 byte value |
| | | | 0 | 0 | 1 | 0 | 0 | Unsigned Integer, 1 byte value |
| | | | 0 | 0 | 1 | 0 | 1 | Unsigned Integer, 2 byte value |
| | | | 0 | 0 | 1 | 1 | 0 | Unsigned Integer, 4 byte value |
| | | | 0 | 0 | 1 | 1 | 1 | Unsigned Integer, 8 byte value |
| | | | 0 | 1 | 0 | 0 | 0 | Boolean False |
| | | | 0 | 1 | 0 | 0 | 1 | Boolean True |
| | | | 0 | 1 | 0 | 1 | 0 | Floating Point Number, 4 byte value |
| | | | 0 | 1 | 0 | 1 | 1 | Floating Point Number, 8 byte value |
| | | | 0 | 1 | 1 | 0 | 0 | UTF8-String, 1 byte length |
| | | | 0 | 1 | 1 | 0 | 1 | UTF8-String, 2 byte length |
| | | | 0 | 1 | 1 | 1 | 0 | UTF8-String, 4 byte length |
| | | | 0 | 1 | 1 | 1 | 1 | UTF8-String, 8 byte length |
| | | | 1 | 0 | 0 | 0 | 0 | Byte String, 1 byte length |
| | | | 1 | 0 | 0 | 0 | 1 | Byte String, 2 byte length |
| | | | 1 | 0 | 0 | 1 | 0 | Byte String, 4 byte length |
| | | | 1 | 0 | 0 | 1 | 1 | Byte String, 8 byte length |
| | | | 1 | 0 | 1 | 0 | 0 | Null |

TABLE 1-continued

Example element type field values.

| 7 | 6 | 5 | 4 | 3 | 2 | 1 | 0 | |
|---|---|---|---|---|---|---|---|---|
| | | 1 | 0 | 1 | 0 | 1 | | Dictionary |
| | | 1 | 0 | 1 | 1 | 0 | | Array |
| | | 1 | 0 | 1 | 1 | 1 | | Path |
| | | 1 | 1 | 0 | 0 | 0 | | End of Container |

The tag control field indicates a form of the tag in the tag field 1122 assigned to the TLV element (including a zero-length tag). Examples, of tag control field values are provided in Table 2 below.

TABLE 2

Example values for tag control field.

| 7 | 6 | 5 | 4 | 3 | 2 | 1 | 0 | |
|---|---|---|---|---|---|---|---|---|
| 0 | 0 | 0 | | | | | | Anonymous, 0 bytes |
| 0 | 0 | 1 | | | | | | Context-specific Tag, 1 byte |
| 0 | 1 | 0 | | | | | | Core Profile Tag, 2 bytes |
| 0 | 1 | 1 | | | | | | Core Profile Tag, 4 bytes |
| 1 | 0 | 0 | | | | | | Implicit Profile Tag, 2 bytes |
| 1 | 0 | 1 | | | | | | Implicit Profile Tag, 4 bytes |
| 1 | 1 | 0 | | | | | | Fully-qualified Tag, 6 bytes |
| 1 | 1 | 1 | | | | | | Fully-qualified Tag, 8 bytes |

In other words, in embodiments having a control byte, the control byte may indicate a length of the tag.

In certain embodiments, the tag field 1122 may include zero to eight bytes, such as eight, sixteen, thirty two, or sixty four bits. In some embodiments, the tag of the tag field may be classified as profile-specific tags or context-specific tags. Profile-specific tags identify elements globally using a vendor Id, a profile Id, and/or tag number as discussed below. Context-specific tags identify TLV elements within a context of a containing dictionary element and may include a single-byte tag number. Since context-specific tags are defined in context of their containers, a single context-specific tag may have different interpretations when included in different containers. In some embodiments, the context may also be derived from nested containers.

In embodiments having the control byte, the tag length is encoded in the tag control field and the tag field 1122 includes a possible three fields: a vendor Id field, a profile Id field, and a tag number field. In the fully-qualified form, the encoded tag field 1122 includes all three fields with the tag number field including 16 or 32 bits determined by the tag control field. In the implicit form, the tag includes only the tag number, and the vendor Id and profile number are inferred from the protocol context of the TLV element. The core profile form includes profile-specific tags, as discussed above. Context-specific tags are encoded as a single byte conveying the tag number. Anonymous elements have zero-length tag fields 1122.

In some embodiments without a control byte, two bits may indicate a length of the tag field 1122, two bits may indicate a length of the length field 1124, and four bits may indicate a type of information stored in the value field 1126. An example of possible encoding for the upper 8 bits for the tag field is illustrated below in Table 3.

TABLE 3

Tag field of a TLV packet

Byte 0

| 7 | 6 | 5 | 4 | 3 | 2 | 1 | 0 | Description |
|---|---|---|---|---|---|---|---|---|
| 0 | 0 | — | — | — | — | — | — | Tag is 8 bits |
| 0 | 1 | — | — | — | — | — | — | Tag is 16 bits |
| 1 | 0 | — | — | — | — | — | — | Tag is 32 bits |
| 1 | 1 | — | — | — | — | — | — | Tag is 64 bits |
| — | — | 0 | 0 | — | — | — | — | Length is 8 bits |
| — | — | 0 | 1 | — | — | — | — | Length is 16 bits |
| — | — | 1 | 0 | — | — | — | — | Length is 32 bits |
| — | — | 1 | 1 | — | — | — | — | Length is 64 bits |
| — | — | | | 0 | 0 | 0 | 0 | Boolean |
| — | — | | | 0 | 0 | 0 | 1 | Fixed 8-bit Unsigned |
| — | — | | | 0 | 0 | 1 | 0 | Fixed 8-bit Signed |
| — | — | | | 0 | 0 | 1 | 1 | Fixed 16-bit Unsigned |
| — | — | | | 0 | 1 | 0 | 0 | Fixed 16-bit Signed |
| — | — | | | 0 | 1 | 0 | 1 | Fixed 32-bit Unsigned |
| — | — | | | 0 | 1 | 1 | 0 | Fixed 32-bit Signed |
| — | — | | | 0 | 1 | 1 | 1 | Fixed 64-bit Unsigned |
| — | — | | | 1 | 0 | 0 | 0 | Fixed 64-bit Signed |
| — | — | | | 1 | 0 | 0 | 1 | 32-bit Floating Point |
| — | — | | | 1 | 0 | 1 | 0 | 64-bit Floating Point |
| — | — | | | 1 | 0 | 1 | 1 | UTF-8 String |
| — | — | | | 1 | 1 | 0 | 0 | Opaque Data |
| — | — | | | 1 | 1 | 0 | 1 | Container |

As illustrated in Table 3, the upper 8 bits of the tag field 1122 may be used to encode information about the tag field 1122, length field 1124, and the value field 1126, such that the tag field 112 may be used to determine length for the tag field 122 and the length fields 1124. Remaining bits in the tag field 1122 may be made available for user-allocated and/or user-assigned tag values.

The length field 1124 may include eight, sixteen, thirty two, or sixty four bits as indicated by the tag field 1122 as illustrated in Table 3 or the element field as illustrated in Table 2. Moreover, the length field 1124 may include an unsigned integer that represents a length of the encoded in the value field 1126. In some embodiments, the length may be selected by a device sending the TLV element. The value field 1126 includes the payload data to be decoded, but interpretation of the value field 1126 may depend upon the tag length fields, and/or control byte. For example, a TLV packet without a control byte including an 8 bit tag is illustrated in Table 4 below for illustration.

TABLE 4

Example of a TLV packet including an 8-bit tag

| Tag | Length | Value | Description |
|---|---|---|---|
| 0x0d | 0x24 | | |
| 0x09 | 0x04 | 0x42 95 00 00 | 74.5 |
| 0x09 | 0x04 | 0x42 98 66 66 | 76.2 |
| 0x09 | 0x04 | 0x42 94 99 9a | 74.3 |
| 0x09 | 0x04 | 0x42 98 99 9a | 76.3 |
| 0x09 | 0x04 | 0x42 95 33 33 | 74.6 |
| 0x09 | 0x04 | 0x42 98 33 33 | 76.1 |

As illustrated in Table 4, the first line indicates that the tag field 1122 and the length field 1124 each have a length of 8 bits. Additionally, the tag field 1122 indicates that the tag type is for the first line is a container (e.g., the TLV packet). The tag field 1124 for lines two through six indicate that each entry in the TLV packet has a tag field 1122 and length field 1124 consisting of 8 bits each. Additionally, the tag field 1124 indicates that each entry in the TLV packet has a value field 1126 that includes a 32-bit floating point. Each entry in the value field 1126 corresponds to a floating number that may be decoded using the corresponding tag field 1122 and length field 1124 information. As illustrated in this example, each entry in the value field 1126 corresponds to a temperature in Fahrenheit. As can be understood, by storing data in a TLV packet as described above, data may be transferred compactly while remaining flexible for varying lengths and information as may be used by different devices in the fabric. Moreover, in some embodiments, multi-byte integer fields may be transmitted in little-endian order or big-endian order.

By transmitting TLV packets in using an order protocol (e.g., little-endian) that may be used by sending/receiving device formats (e.g., JSON), data transferred between nodes may be transmitted in the order protocol used by at least one of the nodes (e.g., little endian). For example, if one or more nodes include ARM or ix86 processors, transmissions between the nodes may be transmitted using little-endian byte ordering to reduce the use of byte reordering. By reducing the inclusion of byte reordering, the TLV format enable devices to communicate using less power than a transmission that uses byte reordering on both ends of the transmission. Furthermore, TLV formatting may be specified to provide a one-to-one translation between other data storage techniques, such as JSON+ Extensible Markup Language (XML). As an example, the TLV format may be used to represent the following XML Property List:

```
<?xml version="1.0" encoding="UTF-8"?>
<!DOCTYPE plist PUBLIC "-//Apple Computer//DTD PLIST 1.0//EN"
"http://www.apple.com/DTDs/PropertyList-1.0.dtd">
<plist version="1.0">
<dict>
  <key>OfflineMode</key>
  <false/>
  <key>Network</key>
  <dict>
    <key>IPv4</key>
    <dict>
      <key>Method</key>
      <string>dhcp</string>
    </dict>
    <key>IPv6</key>
    <dict>
      <key>Method</key>
      <string>auto</string>
    </dict>
  </dict>
  <key>Technologies</key>
  <dict>
    <key>wifi</key>
    <dict>
      <key>Enabled</key>
      <true/>
      <key>Devices</key>
      <dict>
        <key>wifi__18b4300008b027</key>
        <dict>
          <key>Enabled</key>
          <true/>
        </dict>
      </dict>
      <key>Services</key>
      <array>
        <string>wifi__18b4300008b027__3939382d33204 16
c70696e652054657 272616365</string>
      </array>
    </dict>
    <key>802.15.4</key>
    <dict>
      <key>Enabled</key>
```
-continued
```
      <true/>
      <key>Devices</key>
      <dict>
        <key>802.15.4__18b43000000002fac4</key>
        <dict>
          <key>Enabled</key>
          <true/>
        </dict>
      </dict>
      <key>Services</key>
      <array>
        <string>802.15.4__18b43000000002fac4__3 939382d332041
6c70696e6520546572</string>
      </array>
    </dict>
  </dict>
  <key>Services</key>
  <dict>
    <key>wifi__18b4300008b027__3939382d3320416c70696e6520546572
72616365</key>
    <dict>
      <key>Name</key>
      <string>998-3 Alpine Terrace</string>
      <key>SSID</key>
      <data>3939382d3320416c70696e652054657272616365
</data>
      <key>Frequency</key>
      <integer>2462</integer>
      <key>AutoConnect</key>
      <true/>
      <key>Favorite</key>
      <true/>
      <key>Error</key>
      <string/>
      <key>Network</key>
      <dict>
        <key>IPv4</key>
        <dict>
          <key>DHCP</key>
          <dict>
            <key>LastAddress</key>
            <data>0a02001e</data>
          </dict>
        </dict>
        <key>IPv6</key>
        <dict/>
      </dict>
    </dict>
    <key>802.15.4__18b43000000002fac4__3939382d3320416c70696e
6520546572</key>
    <dict>
      <key>Name</key>
      <string>998-3 Alpine Ter</string>
      <key>EPANID</key>
      <data>3939382d3320416c70696e6520546572</data>
      <key>Frequency</key>
      <integer>2412</integer>
      <key>AutoConnect</key>
      <true/>
      <key>Favorite</key>
      <true/>
      <key>Error</key>
      <string/>
      <key>Network</key>
      <dict/>
    </dict>
  </dict>
</dict>
</plist>
```

As an example, the above property list may be represented in tags of the above described TLV format (without a control byte) according to Table 5 below.

TABLE 5

Example representation of the XML Property List in TLV format

| XML Key | Tag Type | Tag Number |
|---|---|---|
| OfflineMode | Boolean | 1 |
| IPv4 | Container | 3 |
| IPv6 | Container | 4 |
| Method | String | 5 |
| Technologies | Container | 6 |
| WiFi | Container | 7 |
| 802.15.4 | Container | 8 |
| Enabled | Boolean | 9 |
| Devices | Container | 10 |
| ID | String | 11 |
| Services | Container | 12 |
| Name | String | 13 |
| SSID | Data | 14 |
| EPANID | Data | 15 |
| Frequency | 16-bit Unsigned | 16 |
| AutoConnect | Boolean | 17 |
| Favorite | Boolean | 18 |
| Error | String | 19 |
| DHCP | String | 20 |
| LastAddress | Data | 21 |
| Device | Container | 22 |
| Service | Container | 23 |

Similarly, Table 6 illustrates an example of literal tag, length, and value representations for the example XML Property List.

TABLE 6

Example of literal values for tag, length, and value fields for XML Property List

| Tag | Length | Value | Description |
|---|---|---|---|
| 0x40 01 | 0x01 | 0 | OfflineMode |
| 0x4d 02 | 0x14 | | Network |
| 0x4d 03 | 0x07 | | Network.IPv4 |
| 0x4b 05 | 0x04 | "dhcp" | Network.IPv4.Method |
| 0x4d 04 | 0x07 | | Network.IPv6 |
| 0x4b 05 | 0x04 | "auto" | Network.IPv6.Method |
| 0x4d 06 | 0xd6 | | Technologies |
| 0x4d 07 | 0x65 | | Technologies.wifi |
| 0x40 09 | 0x01 | 1 | Technologies.wifi.Enabled |
| 0x4d 0a | 0x5e | | Technologies.wifi.Devices |
| 0x4d 16 | 0x5b | | Technologies.wifi.Devices.Device.[0] |
| 0x4b 0b | 0x13 | "wifi_18b43 . . ." | Technologies.wifi.Devices.Device.[0].ID |
| 0x40 09 | 0x01 | 1 | Technologies.wifi.Devices.Device.[0].Enabled |
| 0x4d 0c | 0x3e | | Technologies.wifi.Devices.Device.[0].Services |
| 0x0b | 0x 3c | "wifi_18b43 . . ." | Technologies.wifi.Devices.Device.[0].Services.[0] |
| 0x4d 08 | 0x6b | | Technologies.802.15.4 |
| 0x40 09 | 0x01 | 1 | Technologies.802.15.4.Enabled |
| 0x4d 0a | 0x64 | | Technologies.802.15.4.Devices |
| 0x4d 16 | 0x61 | | Technologies.802.15.4.Devices.Device.[0] |
| 0x4b 0b | 0x1a | "802.15.4_18 . . ." | Technologies.802.15.4.Devices.Device.[0].ID |
| 0x40 09 | 0x01 | 1 | Technologies.802.15.4.Devices.Device.[0].Enabled |
| 0x4d 0c | 0x3d | | Technologies.802.15.4.Devices.Device.[0].Services |
| 0x0b | 0x 3b | "802.15.4_18 . . ." | Technologies.802.15.4.Devices.Device.[0].Services.[0] |
| 0x4d 0c | 0xcb | | Services |
| 0x4d 17 | 0x75 | | Services.Service.[0] |
| 0x4b 0b | 0x13 | "wifi_18b43 . . ." | Services.Service.[0].ID |
| 0x4b 0d | 0x14 | "998-3 Alp . . ." | Services.Service.[0].Name |
| 0x4c 0f | 0x28 | 3939382d . . . | Services.Service.[0].SSID |
| 0x45 10 | 0x02 | 2462 | Services.Service.[0].Frequency |
| 0x40 11 | 0x01 | 1 | Services.Service.[0].AutoConnect |
| 0x40 12 | 0x01 | 1 | Services.Service.[0].Favorite |
| 0x4d 02 | 0x0d | | Services.Service.[0].Network |
| 0x4d 03 | 0x0a | | Services.Service.[0].Network.IPv4 |
| 0x4d 14 | 0x07 | | Services.Service.[0].Network.IPv4.DHCP |
| 0x45 15 | 0x04 | 0x0a02001e | Services.Service.[0].Network.IPv4.LastAddress |
| 0x4d 17 | 0x50 | | Services.Service.[1] |
| 0x4b 0b | 0x1a | "802.15.4_18 . . ." | Services.Service.[1].ID |
| 0x4c 0d | 0x10 | "998-3 Alp . . ." | Services.Service.[1].Name |
| 0x4c 0f | 0x10 | 3939382d . . . | Services.Service.[1].EPANID |
| 0x45 10 | 0x02 | 2412 | Services.Service.[1].Frequency |
| 0x40 11 | 0x01 | 1 | Services.Service.[1].AutoConnect |
| 0x40 12 | 0x01 | 1 | Services.Service.[1].Favorite |

The TLV format enables reference of properties that may also be enumerated with XML, but does so with a smaller storage size. For example, Table 7 illustrates a comparison of data sizes of the XML Property List, a corresponding binary property list, and the TLV format.

TABLE 7

Comparison of the sizes of property list data sizes.

| List Type | Size in Bytes | Percentage of XML Size |
|---|---|---|
| XML | 2,199 | — |
| Binary | 730 | −66.8% |
| TLV | 450 | −79.5% |

By reducing the amount of data used to transfer data, the TLV format enables the fabric 1000 transfer data to and/or from devices having short duty cycles due to limited power (e.g., battery supplied devices). In other words, the TLV format allows flexibility of transmission while increasing compactness of the data to be transmitted.

B. General Message Protocol

Figure 12:
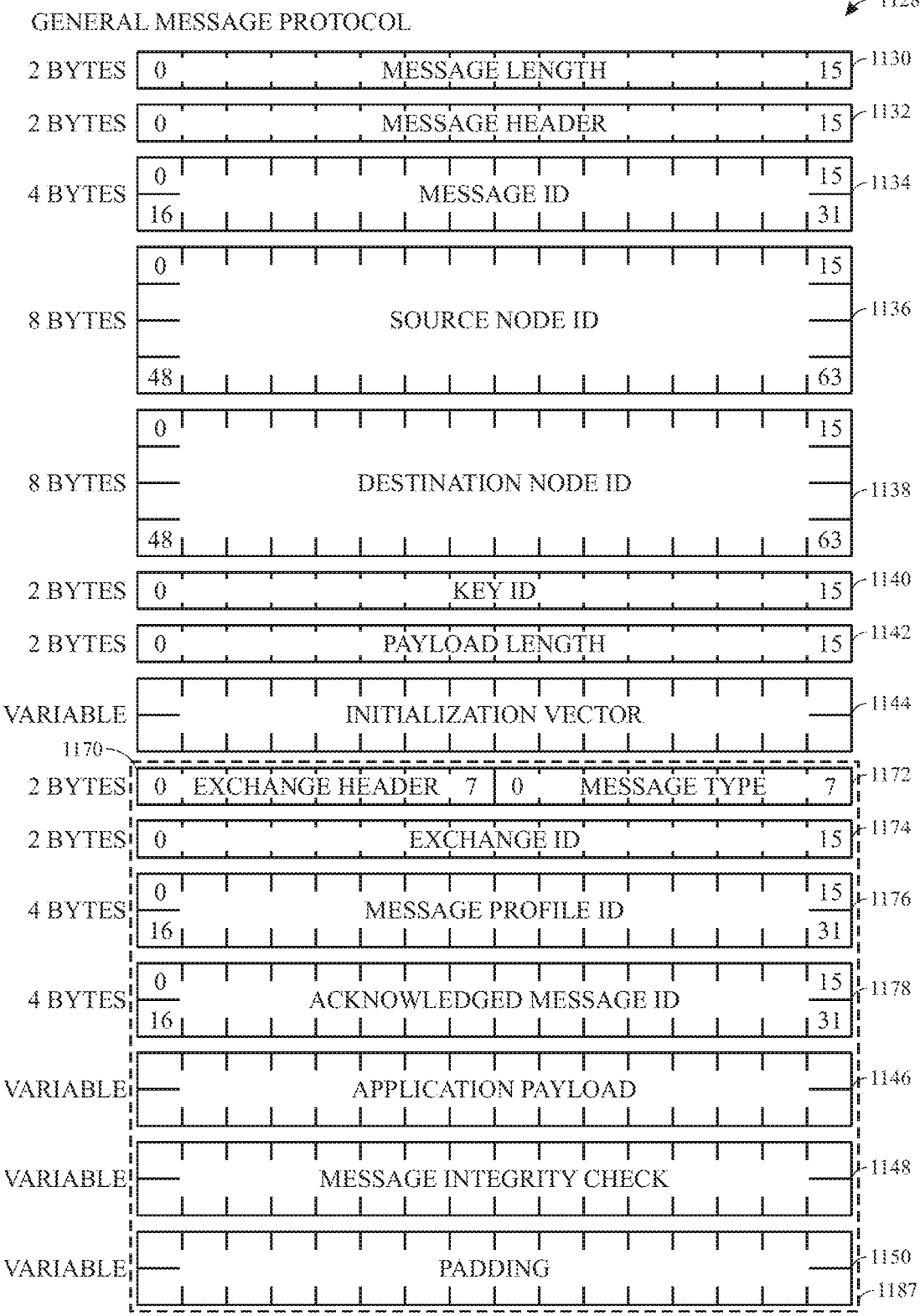
FIG. 12 illustrates a general message protocol (GMP) that may be used to transmit data over the fabric network with a message header, a key identifier field, and an exchange header indicating information about the exchange, in accordance with an embodiment.

In addition to sending particular entries of varying sizes, data may be transmitted within the fabric using a general message protocol that may incorporate TLV formatting. An embodiment of a general message protocol (GMP) 1128 is illustrated in FIG. 12. In certain embodiments, the general message protocol (GMP) 1128 may be used to transmit data within the fabric. The GMP 1128 may be used to transmit data via connectionless protocols (e.g., UDP) and/or connection-oriented protocols (e.g., TCP). Accordingly, the GMP 1128 may flexibly accommodate information that is used in one protocol while ignoring such information when using another protocol. Moreover, the GMP 1226 may enable omission of fields that are not used in a specific transmission. Data that may be omitted from one or more GMP 1226 transfers is generally indicated using grey borders around the data units. In some embodiments, the multi-byte integer fields may be transmitted in a little-endian order or a big-endian order.

i. Message Length

In some embodiments, the GMP 1128 may include a Message Length field 1130. In some embodiments, the Message Length field 1130 includes 2 bytes. A value in the Message Length field 1130 corresponds to an unsigned integer indicating an overall length of the message in bytes, excluding the Message Length field 1130 itself. In some embodiments, the Message Length field 1130 may be present when the GMP 1128 is transmitted over a TCP connection, but when the GMP 1128 is transmitted over a UDP connection, the message length may be equal to the payload length of the underlying UDP packet obviating the Message length field 1130.

ii. Message Header

Figure 13:
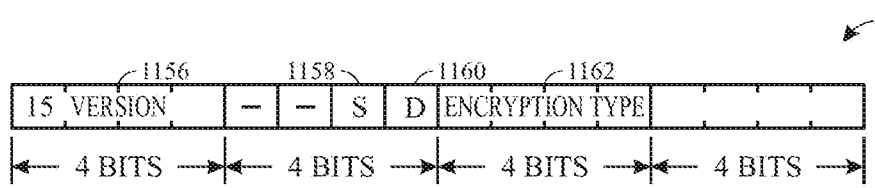
FIG. 13 illustrates the message header field of the GMP of FIG. 12, in accordance with an embodiment.

The GMP 1128 may also include a Message Header 1132 regardless of whether the GMP 1128 is transmitted using TCP or UDP connections. In some embodiments, the Message Header 1132 includes two bytes of data arranged in the format illustrated in FIG. 13. As illustrated in FIG. 13, the Message Header 1132 includes a Version field 1166. The Version field 1166 corresponds to a version of the GMP 1128 that is used to encode the message. Accordingly, as the GMP 1128 is updated, new versions of the GMP 1128 may be created, but each device in a fabric may be able to receive a data packet in any version of GMP 1128 known to the device. In addition to the Version field 1166, the Message Header 1132 may include an S flag field 1168 and a D Flag 1170. The S Flag 1158 is a single bit that indicates whether a Source Node Id (discussed below) field is included in the transmitted packet. Similarly, the D Flag 1170 is a single bit that indicates whether a Destination Node Id (discussed below) field is included in the transmitted packet.

The Message Header 1132 also includes an Encryption Type field 1172. The Encryption Type field 1172 includes four bits that specify which type of encryption/integrity checking applied to the message, if any. For example, 0x0 may indicate that no encryption or message integrity checking is included, but a decimal 0x1 may indicate that AES-128-CTR encryption with HMAC-SHA-1 message integrity checking is included.

iii. Message Id

Returning to FIG. 12, the GMP 1128 also includes a Message Id field 1134 that may be included in a transmitted message regardless of whether the message is sent using TCP or UDP. The Message Id field 1134 includes four bytes that correspond to an unsigned integer value that uniquely identifies the message from the perspective of the sending node. In some embodiments, nodes may assign increasing Message Id 1134 values to each message that they send returning to zero after reaching $2^{32}$ messages.

iv. Source Node Id

In certain embodiments, the GMP 1128 may also include a Source Node Id field 1136 that includes eight bytes. As discussed above, the Source Node Id field 1136 may be present in a message when the single-bit S Flag 1158 in the Message Header 1132 is set to 1. In some embodiments, the Source Node Id field 1136 may contain the Interface ID 1104 of the ULA 1098 or the entire ULA 1098. In some embodiments, the bytes of the Source Node Id field 1136 are transmitted in an ascending index-value order (e.g., EUI[0] then EUI[1] then EUI[2] then EUI[3], etc.).

v. Destination Node Id

The GMP 1128 may include a Destination Node Id field 1138 that includes eight bytes. The Destination Node Id field 1138 is similar to the Source Node Id field 1136, but the Destination Node Id field 1138 corresponds to a destination node for the message. The Destination Node Id field 1138 may be present in a message when the single-bit D Flag 1170 in the Message Header 1132 is set to 1. Also similar to the Source Node Id field 1136, in some embodiments, bytes of the Destination Node Id field 1138 may be transmitted in an ascending index-value order (e.g., EUI[0] then EUI[1] then EUI[2] then EUI[3], etc.).

vi. Key Id

In some embodiments, the GMP 1128 may include a Key Id field 1140. In certain embodiments, the Key Id field 1140 includes two bytes. The Key Id field 1140 includes an unsigned integer value that identifies the encryption/message integrity keys used to encrypt the message. The presence of the Key Id field 1140 may be determined by the value of Encryption Type field 1172 of the Message Header 1132. For example, in some embodiments, when the value for the Encryption Type field 1172 of the Message Header 1132 is 0x0, the Key Id field 1140 may be omitted from the message.

Figure 14:
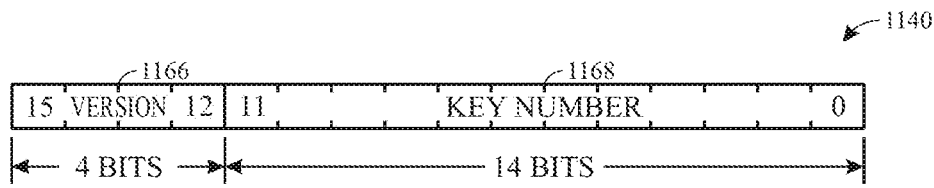
FIG. 14 illustrates the key identifier field of the GMP of FIG. 12, in accordance with an embodiment.

An embodiment of the Key Id field 1140 is presented in FIG. 14. In the illustrated embodiment, the Key Id field 1140 includes a Key Type field 1174 and a Key Number field 1176. In some embodiments, the Key Type field 1174 includes four bits. The Key Type field 1174 corresponds to an unsigned integer value that identifies a type of encryption/message integrity used to encrypt the message. For example, in some embodiments, if the Key Type field 1174 is 0x0, the fabric key is shared by all or most of the nodes in the fabric. However, if the Key Type field 1174 is 0x1, the fabric key is shared by a pair of nodes in the fabric.

The Key Id field 1140 also includes a Key Number field 1176 that includes twelve bits that correspond to an unsigned integer value that identifies a particular key used to encrypt the message out of a set of available keys, either shared or fabric keys.

vii. Payload Length

In some embodiments, the GMP 1128 may include a Payload Length field 1142. The Payload Length field 1142, when present, may include two bytes. The Payload Length field 1142 corresponds to an unsigned integer value that indicates a size in bytes of the Application Payload field. The Payload Length field 1142 may be present when the message is encrypted using an algorithm that uses message padding, as described below in relation to the Padding field.

viii. Initialization Vector

In some embodiments, the GMP 1128 may also include an Initialization Vector (IV) field 1144. The IV field 1144, when present, includes a variable number of bytes of data. The IV field 1144 contains cryptographic IV values used to encrypt the message. The IV field 1144 may be used when the message is encrypted with an algorithm that uses an IV and omitted from messages that are encrypted using algorithms that do not use an IV. The length of the IV field 1144 may be derived by the type of encryption used to encrypt the message.

ix. Application Payload

The GMP 1128 includes an Application Payload field 1146. The Application Payload field 1146 includes a variable number of bytes. The Application Payload field 1146 includes application data conveyed in the message. The length of the Application Payload field 1146 may be determined from the Payload Length field 1142, when present. If the Payload Length field 1142 is not present, the length of the Application Payload field 1146 may be determined by subtracting the length of all other fields from the overall length of the message and/or data values included within the Application Payload 1156 (e.g., TLV).

The Application Payload field 1146 may include a Profile Identifier ("Id") field. The Profile Id indicates a "theme of discussion" used to indicate what type of communication occurs in the message. The Profile Id may correspond to one or more profiles that a device may be capable of communicating. For example, the Profile Id may indicate that the message relates to a core profile, a software update profile, a status update profile, a data management profile, a climate and comfort profile, a security profile, a safety profile, and/or other suitable profile types. Each device on the fabric may include a list of profiles which are relevant to the device and in which the device is capable of "participating in the discussion." For example, many devices in a fabric may include the core profile, the software update profile, the status update profile, and the data management profile, but only some devices would include the climate and comfort profile.

In some embodiments, an indication of the Profile Id may provide sufficient information to provide a schema for data transmitted for the profile. However, in some embodiments, additional information may be used to determine further guidance for decoding the Application Payload field 1146. In such embodiments, the Application Payload field 1146 may include a Profile-Specific Header field. Some profiles may not use the Profile-Specific Header field thereby enabling the Application Payload field 1146 to omit the Profile-Specific Header field. Upon determination of a schema from the Profile Id field and/or the Profile-Specific Header field, data may be encoded/decoded in an Application Payload sub-field. The Application Payload sub-field includes the core application data to be transmitted between devices and/or services to be stored, rebroadcast, and/or acted upon by the receiving device/service. In some embodiments, the Profile Id and/or the Profile-Specific Header information may be included in a field outside of the Application Payload field 1146.

x. Message Integrity Check

In some embodiments, the GMP 1128 may also include a Message Integrity Check (MIC) field 1148. The MIC field 1148, when present, includes a variable length of bytes of data containing a MIC for the message. The length and byte order of the field depends upon the integrity check algorithm in use. For example, if the message is checked for message integrity using HMAC-SHA-1, the MIC field 1148 includes twenty bytes in big-endian order. Furthermore, the presence of the MIC field 1148 may be determined by whether the Encryption Type field 1172 of the Message Header 1132 includes any value other than 0x0.

xi. Padding

The GMP 1128 may also include a Padding field 1150. The Padding field 1150, when present, includes a sequence of bytes representing a cryptographic padding added to the message to make the encrypted portion of the message evenly divisible by the encryption block size. The presence of the Padding field 1150 may be determined by whether the type of encryption algorithm (e.g., block ciphers in cipher-block chaining mode) indicated by the Encryption Type field 1172 in the Message Header 1132 uses cryptographic padding.

xii. Exchange Header

Figure 15:
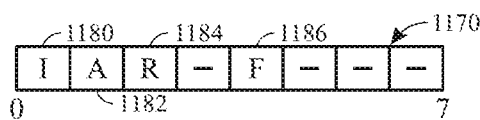
FIG. 15 illustrates the exchange header of the GMP of FIG. 12, in accordance with an embodiment.

In some embodiments, the GMP 1128 also includes an Exchange Header 1170. FIG. 15 illustrates an embodiment of the Exchange Header 1170. The Exchange Header 1170 includes an Initiator Flag 1180 that indicates that the message sent was sent by the initiator of the exchange. The Exchange Header 1170 also includes an Acknowledgment Flag 1182 that indicates whether the message serves as an acknowledgment of a previous message received by the device currently sending the message. If the Acknowledgment Flag 1182 is set to true, the GMP 1128 may also include an Acknowledged Message Identifier discussed below. The Exchange Header 1170 also includes an Acknowledgment Request Flag 1184 that indicates whether the message should invoke an acknowledgment when received by a target device. The Exchange Header 1170 also includes a Compatibility Field 1186 that indicates compatibility with older protocol versions.

xiii. Message Type

In some embodiments, the GMP 1128 also includes a Message Type 1172 that indicates the type of message (e.g., status report, subscribe request, etc.). In some embodiments, this Message Type 1172 may be interpreted relative to an identified profile identified in the message.

xiv. Message Profile ID

The GMP 1128 may also include a Message Profile Identifier (ID) field 1176 that indicates a profile (e.g., Core, Data Transfer, etc.) for the message through which the Message Type field 1156 may be interpreted. In some embodiments, the Message Profile ID field 1160 may include 4 bytes.

xv. Acknowledged Message ID

The GMP 1128 may also include an Acknowledged Message Identifier (ID) field 1178 that includes an unsigned integer value that contains the message identifier of a previous message that is being acknowledged by the current message. As previously discussed, the acknowledgment flag 1180 indicates whether the current message is an acknowledgment of a previous message. Therefore, in some embodiments, when the acknowledgment flag 1180 is set to false, the Acknowledged Message ID 1162 may be omitted from the message and/or the version of the message format is compatible with an Acknowledged Message ID field 1162. In certain embodiments, when the Acknowledged Message ID 1162 is included in the message, the Acknowledged Message ID 1162 may include 4 bytes.

xvi. Encryption

The Application Payload field 1146, the MIC field 1148, the Padding field 1150 together form an Encryption block 1152. The Encryption block 1152 includes the portions of the message that are encrypted when the Encryption Type field 1172 in the Message Header 1132 is any value other than 0x0.

xvii. Message Signature

In some embodiments, the GMP 1128 may also include a Message Signature field 1187. The Message Signature field 1187, when present, includes a sequence of bytes of variable length that contains a cryptographic signature of the message. The length and the contents of the Message Signature field may be determined according to the type of signature algorithm in use and indicated elsewhere in the message. For example, if ECDSA using the Prime256v1 elliptical curve parameters is the algorithm in use, the Message Signature field 1187 may include two thirty-two bit integers encoded in little-endian order.

III. Reliable Messaging Protocol

As previously discussed, allocating a portion of the Exchange Header 1170 to requests for acknowledgments and indicating an acknowledgment, a lower bandwidth exchange protocol (e.g., UDP) with relatively small overhead may be used for reliable messaging without resorting to larger overheads used in other reliable messaging protocols (e.g., TCP). Additionally or alternatively, some embodiments may include bundling acknowledgments, acknowledgments may be appended to responses to "piggyback" the acknowledgment to the response, and/or each acknowledgment may be denoted by a separate acknowledgment identifier (ID) in the message to indicate that each acknowledgment exists regardless of whether the acknowledgment is alone in a message or included with one or more other acknowledgments in the message.

Furthermore, the devices may employ flow control to control a rate of transfer between the devices. In some embodiments, the flow control may be exerted by the sending and/or receiving device for the message being currently transferred. The flow controlling device may send the other device a lightweight slow or pause command to alter the transmission of data for the message between the devices.

In some embodiments, the message size for reliable messaging may be limited to be less than or equal to a size of a maximum message length for the underlying protocol (e.g., UDP datagram size).

In certain embodiments, the devices in a fabric may employ duplicate message detection to reduce network traffic. For example, a receiving device may determine that it has received multiple copies of the same message possibly through alternative routes through the fabric. Once such a detection is made, the receiving device may respond with a single response rather than responding to each message. As discussed below, such determinations may be made by using unique identifiers for the messages to determine that two received messages actually refer to the same message.

In some embodiments, duplicate message detection may be employed at parent routers that are used to route messages to a sleepy device that is coupled to the parent router. By eliminating duplications, the parent router may reduce an amount of traffic sent to the connected sleepy device when the sleepy device awakens. Furthermore, in the sleepy devices scenario, the reliable messaging protocol may leverage storage nodes to be delay messages/acknowledgments to enable deployment of the reliable message in fabrics with sleepy devices.

a. Peer Exchange Management

In order to exchange data, nodes may first establish an exchange context. Reliable messaging operates within message exchanges and reliably delivers messages to the endpoint. Reliable messaging may be able to exchange any resource related control parameters between endpoints during the initial phase of the exchange without an explicit connection management scheme and have the endpoints agree on the set of control parameters by piggybacking them in optional fields in the first set of messages. These parameters could be maximum number of outstanding messages, maximum message size, retransmission timeout, etc.

Within an exchange context between two endpoints, data flows through as messages. In order to keep the design simple, reliable messaging may ignore fragmentation/reassembly of application messages. Instead, there should be a strict enforcement of message size that the application needs to send down to lower layers. Fragmentation and reassembly of IPv6 to 802.15.4 or Bluetooth packets may be performed at the lower adaption layers.

From the sender's perspective, each outgoing data message may be queued and held until it has been acknowledged back by the receiver. Attempts by the sender to send a message larger than the agreed upon maximum message size would result in an error. Moreover, the devices may abort the connection if an incoming message is larger than the acceptable message size negotiated during connection setup. Reliability is achieved by the usage of message identifiers, acknowledgment of message receipt, timeout and retransmission of missing messages. Checksum and/or Hash MAC based data integrity checking mechanisms may be provided by the security layer and the underlying transport layer (UDP/TCP).

b. Message Types

Various control messages may be used to deploy the reliable message protocol. In some embodiments, these control messages may be defined in a core profile and/or any other profile that is designated as the current profile according to the GMP 1128. As previously discussed, these message types may be indicated in the Message Type field 1172.

i. Acknowledgment Message

An acknowledgment message is sent back to the sender of the original message requesting acknowledgment to confirm receipt. In some embodiments, the acknowledgment message is in the core profile with a message type of null. As previously discussed, this message would have the acknowledgment flag 1180 bit set and contain the acknowledged message ID 1178.

If there is a response coming from the application then the acknowledgment may be included in the response message. In such a case, the message would be of the profile and message type of the application and contain the acknowledged message ID 1178 with the corresponding flag bit set.

ii. Delayed Delivery

The delayed delivery message is generated by an intermediate device (e.g., parent router) which has knowledge of the sleepiness of the recipient node. This intermediate node snoops on traffic to figure out that a message is destined to a sleepy node and generates a delayed delivery message to the original sender. As discussed below, the delayed delivery control message notifies the sender that the recipient is a sleepy device and provides information on the sleep interval of the sleepy device. The intermediate device may obtain this sleep time value by various means, such as a service discovery/directory protocol and/or the sleep interval may be hard-coded or preconfigured. In some embodiments, the delayed delivery message contains the Node Id of the sleepy node and the Message Id of the message that elicited the delayed delivery message response.

iii. Throttle Flow

As previously discussed, in some scenarios, one of the exchanging devices (e.g., receiving device) may need to throttle communications. For example, the throttle flow message is generated by a recipient node application if it does not have any buffers available to process incoming messages. In such a scenario, it can dispatch a throttle flow message to the sending device to indicate that the receiving device's buffers are congested and to specify a time for the sending device to pause subsequent transmissions to the receiving device and/or retransmit any non-acknowledged messages previously sent to the receiving device.

In some embodiments, a throttle flow message may have a counterpart unthrottle action that preemptively allows the receiving device that sent the original throttle flow message to cause the sending device to resume sending its outstanding messages. For example, the receiving device may send a new throttle flow message with a pause duration of zero. In some embodiments, the pause duration may be cautiously set relatively high (e.g., 1 year, 1 day, 3 hours) since congestion periods may be difficult to calculate, but congestion for the receiving device may lower before the estimated time has elapsed.

c. Timers i. Retransmission Timer

In various embodiments, sending devices may retransmit a message if no acknowledgment is received. However, the sending devices may wait for a period of time specified by a retransmission timer. The acknowledgment timer is armed each time a message to be responded to is sent. When the acknowledgment timer elapses, the sending device resends the message unless an acknowledgment is received or a superseding command has been received (e.g., delayed response or throttle timer).

ii. Acknowledgment Timer

The receiving device may also attempt to bundle acknowledgments. Accordingly, the receiving device may hold an acknowledgment for a period of time waiting for any other acknowledgments to be sent. However, the receiving device may track how long the acknowledgment has been held to ensure that the holding time is less than a point at which the sending device retransmits the message. Accordingly, the receiving device may keep an acknowledgment timer that tracks the period of holding of an acknowledgment. When this timer elapses, the receiving device sends the acknowledgment regardless of whether an additional acknowledgment has been queued for sending.

iii. Throttle Timer

As previously discussed, the devices may send throttle messages that pause or reduce transmissions between devices for a period of time. The amount of time specified in the throttle flow message indicates how long to wait before sending new messages and/or resending retransmissions. This amount of time is tracked using a throttle timer that is armed upon receipt of a throttle flow message. In some embodiments, when the sending device has a running throttle timer when the sending device receives a message from the application layer, the device does not send the message out and sends an error back to the application layer.

iv. Single timer

Since maintaining a separate timer object for each message that is to be retransmitted and acknowledged occupies resources. The devices may maintain a single timer that would enables periodically and is used for checking for retransmissions, acknowledgments and throttling. For retransmission, at each timer expiration, the current system time would be checked with a retransmission timeout to determine whether a retransmission is to occur.

Moreover, in order to enhance resource usage, a global table across exchange may be kept for pending retransmissions and another global one for acknowledgments.

In some embodiments, each retransmission context row may include a reference to exchange context; a message id; reference to fully formed, encoded, and encrypted message buffer; send count; and retransmission timeout counter. In certain embodiments, the pending acknowledgment queue may have a depth of one. So, at each timer expiration, the acknowledgment queue is checked for a pending acknowledgment. If so, a solitary acknowledgment message is sent out.

For the throttle timer, at each timer expiration, the device checks to determine whether the throttle timer has expired. If it has, the throttle timeout is reset to zero. Otherwise, if the throttle timer is on, then each attempt by the application to send a message would return an appropriate error back to the application layer.

Each time a message is sent that requests an acknowledgment, a retransmission context object is inserted into the retransmission table or an already existing record's send count is incremented. In some embodiments, a retransmission is retransmitted up to a maximum value (e.g., 2) of the send count and thereafter the application layer is notified of the inability of the protocol to deliver the message. Moreover, if there are pending acknowledgment records in the acknowledgment table, then an acknowledgment can be piggybacked with the sent message and removed from the table. If the acknowledgment list is full and a pending acknowledgment record cannot be entered then an acknowledgment message is immediately sent back to the peer.

d. Duplicate Message Detection

As previously discussed, duplicate messages may be detected and blocked from causing multiple acknowledgments to a single message to efficiently utilize network and device resources. In some embodiments, the receiving devices may detect duplicate messages. The model chosen for suppression of retransmissions would dictate to a fair degree the extent of duplicate detection that happens at the receiver node. In some embodiments, duplicate detection may occur at the border router where the message is cached for delayed delivery as well as at the receiver node. At the receiver node, duplicate detection may happen at the level and would involve comparing of message IDs to discard duplicates.

At the intermediate border router, a duplicate detection mechanism may be used to optimally use the limited buffers to cater to deeply sleepy endpoints. The duplicate detection mechanism may, in some embodiments, look at a higher layer to figure out duplicates or do a byte comparison of the entire packet to detect and discard duplicate network layer packets before queuing them for transmission to the connected sleepy device.

e. Retransmissions

Messages transmitted between devices may be lost for various reasons, such as lossy networks or dropped by the receiver. Thus, as previously discussed, at each sender, the retransmission timer (whose time value is may be an estimate of the roundtrip time for a request to go through and a response to be sent) would be started each time a message is transmitted. In some embodiments, this retransmission timer value may be updated or tuned based on each response or acknowledgment that a sender receives.

If a positive acknowledgment is received before the timer expires, the timer is stopped. Otherwise, if the timer expires, the message is retransmitted, and the timer started again. The sender would attempt a maximum number of retransmissions, as previously discussed, before giving up and notifying the application layer of the failure to deliver the message. In some embodiments, this number of retransmissions may be specified by the application layer according to application programs running atop the reliable messaging protocol.

In some embodiments, some application programs may use messages (e.g., periodic sensor data messages) may not use any acknowledgments and are transmitted only once. On the other hand, there may be other application programs that use acknowledgments for every message transmitted. Some application programs may use some combination therebetween.

Figure 16:
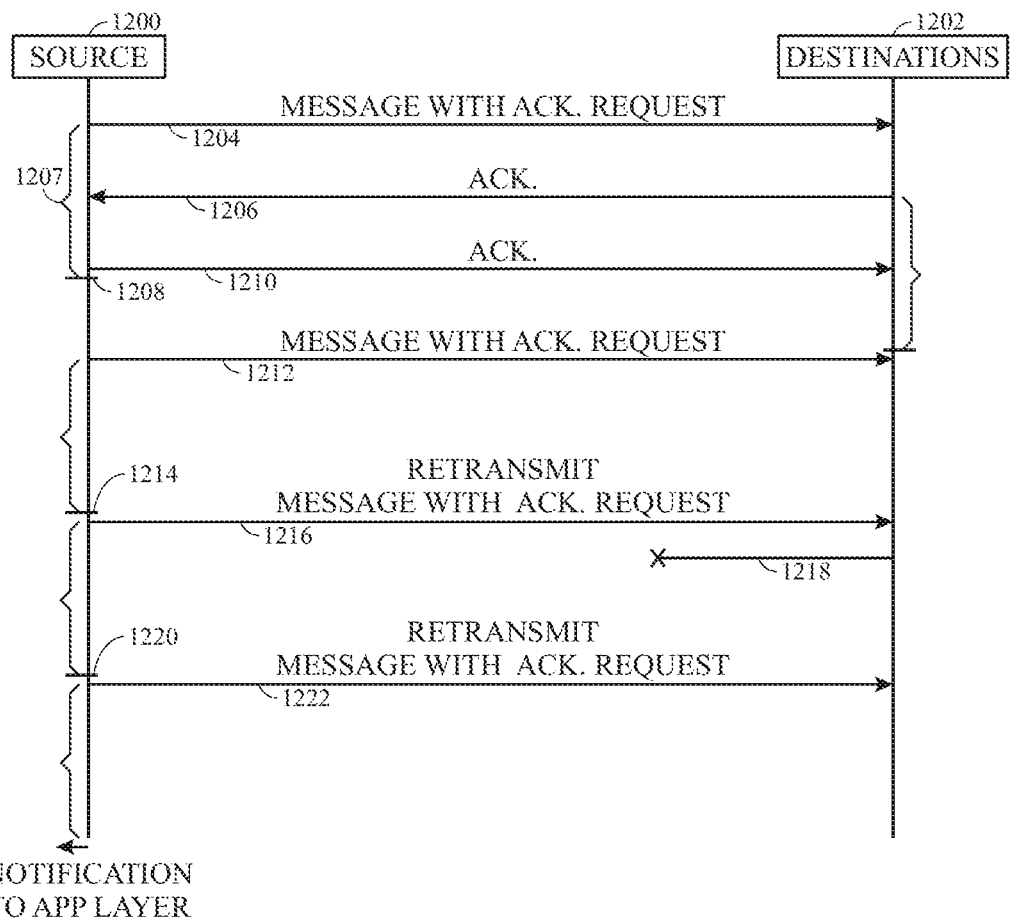
FIG. 16 illustrates an exchange of information between a source device and a destination device using reliability functionality, in accordance with an embodiment.

FIG. 16 illustrates an exchange between a source device 1200 and a destination device 1202. Although the illustrated source device 1200 has a direct connection with the destination device 1202, certain embodiments include 1 or more devices that provide communication between the source device 1200 and the destination device 1202. Furthermore, multiple routes may exist between the source device 1200 and the destination device 1202 through different devices within a fabric.

The source device 1200 sends a message 1204 that an acknowledgment request (e.g., acknowledgment request flag 1182). Upon receiving the message 1204, the destination device 1202 queues up an acknowledgment. In some embodiments, if multiple acknowledgments are queued, the destination device 1202 may respond with acknowledgment 1206 that includes all acknowledgments ready to be sent. If no multiple acknowledgments are queued, certain embodiments of the destination device 1202 may delay the acknowledgment 1206 until another acknowledgment is queued or the delay period has elapsed. Furthermore, if the message 1204 invokes a message, the acknowledgment may be included in the response by adding the acknowledgment to the response using the acknowledged message id 1154 and the acknowledgment flag 1180.

Moreover, when the source device 1200 sends the message 1204, the source device 1200 starts a retransmission timer 1207 that would elapse at a retransmit time. In the illustrated embodiment, the acknowledgment 1206 is received prior to the retransmit time 1208. Accordingly, the source device 1200 disarms and resets the timer for the next transmission. In certain embodiments, acknowledgments (e.g., acknowledgment 1206) may request an acknowledgment. In such embodiments, the source device 1200 may respond with a return acknowledgment 1210. Similar to the acknowledgment 1206, the return acknowledgment 1210 may be sent by itself immediately, sent after an acknowledgment timer has elapsed, bundled with other acknowledgments, or piggybacked onto another message sent between the source device 1200 and the destination device 1202.

As illustrated, the source device 1200 sends another message 1212 with an acknowledgment request. At this point, the source device 1200 starts an acknowledgment timer to track how much time elapses between the message 1212 and a received acknowledgment. Furthermore, as previously discussed, a negotiated or preconfigured retransmit time 1214 (e.g., 10 seconds) may set a threshold at which point the timer causes the source device 1200 to retransmit the message 1212 unless superseded by some other flow control messages (e.g., delayed delivery and/or throttle flow). Since the destination device 1202 has not sent an acknowledgment (e.g., loss at the destination device) before the timer has elapsed and has not received any other flow control messages, the source device 1200 retransmits the message 1212 as retransmitted message 1216. In response to the retransmitted message 1216, the destination device 1202 sends an acknowledgment 1218 that does not arrive at the source device 1200. Accordingly, at retransmit time 1220, the source device 1200 sends a second retransmit message 1222. In the current embodiment, the message 1206 has a maximum retransmit attempt setting of two. Thus, when no acknowledgment is received before the retransmit time 1224, a notification of the error in transmitting the message 1206 is sent to the application layer.

It may be worth noting that although the source device 1200 is the source for the message 1204. The destination device 1202 may be the source for a different independent message with the destination device 1202 acting as the source device and the source device 1200 acting as the destination device.

f. Flow Control

As previously discussed, various commands may be used to delay or stop retransmissions for a period of time.

i. Delayed Response

When the destination endpoint is a sleepy device, the source device may not know that the destination device is a sleepy device. Instead, a border router (who has knowledge of the sleepiness of the receiver endpoint node) notifies the sending device by sending a delayed delivery message containing information on how to adjust its original retransmission timeout value due to the delayed delivery of the message.

In some embodiments, a border router (e.g., device that provides a gateway between networks) intercepts this message at the network layer and notifies the platform layer to form a delayed delivery message to be sent back to the sending device. The border router has knowledge of the sleepy endpoint's wakeup schedule in order to meaningfully adjust the retransmission timeout value in the delayed delivery message. In some embodiments, the border router may employ a directory protocol to learn the sleep period of the destination device. The sent messages would flow all the way up to the parent router and get queued there until the sleepy child node wakes up and polls the parent or until the parent router wakens the sleepy destination device. To block this increased delivery latency from prompting the sender to retransmit the message, the border router sends the delayed delivery as a means to alert the sending device of the sleepy status of the destination device. When the endpoint wakes up and performs a data poll, the parent router forwards the buffered message. Once the receiver gets the message from the parent router, it would send an acknowledgment message back to the sender. In some embodiments, the border router and the parent router may be the same device and/or some functions of the border router or parent router may be performed by the other router.

Figure 17:
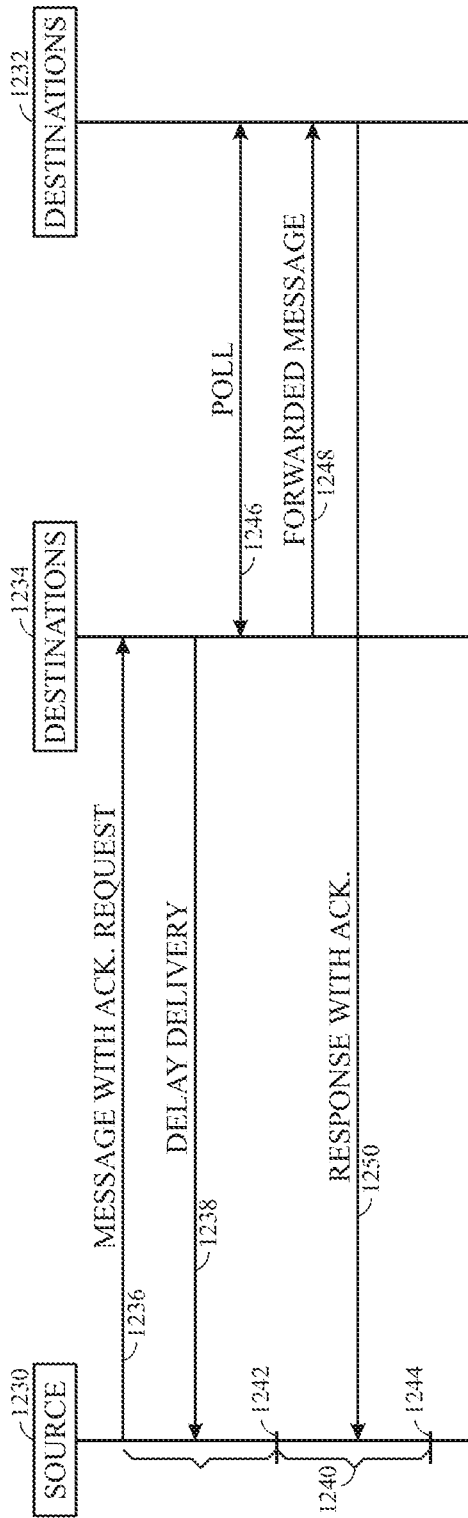
FIG. 17 illustrates an exchange of information between a source device, a parent router, and a destination device using reliability functionality, in accordance with an embodiment.

FIG. 17 illustrates an exchange between a source device 1230 and a sleepy destination device 1232. The devices communicate through a router 1234 that functions as a parent router for the destination device 1232. Furthermore, the router 1234 may include one or more other devices acting as a border router between the source device 1230 and the destination device 1232. The source device 1230 sends a message 1236 with an acknowledgment request intended for the destination device 1232. The router 1234, knowing that the destination device 1232 is in a sleep state, intercepts the message 1236 sends a delay delivery 1238 response to the source device 1230. The delay delivery 1238 includes an indication of how long to delay retransmission of the message. In some embodiments, the delay period is set to an amount of time at least as long as an amount of time left until the destination device 1232 is going to waken. In certain embodiments, the router 1234 may insert the waken interval of the destination device 1232 such that the source device 1230 will not retransmit the message until the destination device 1232 should have completed a state cycle. This delay time 1240 is added to retransmit time 1242 to provide a delayed retransmit time 1244. For example, the if the retransmit time 1242 is 3 seconds and the delay time 1240 is 5 seconds, the delayed retransmit time 1244 is 8 seconds. Thus, if no acknowledgment is received from the destination device 1232 by the delayed retransmit time 1244, the source device 1230 retransmits the message 1236 is retransmitted unless superseded by another flow control command (e.g., throttle flow).

In the illustrated embodiment, the source device 1230 does not retransmit the message 1236, because the destination device 1232 polls 1246 the router 1234 to forward the forwarded message 1248 to invoke a acknowledgment 1250 to be sent to the source 1230 prior to the delayed retransmit time 1244. In some embodiments, the router 1234 may send a waken signal to the destination device 1232 that causes the destination device 1232 to waken and check in with the router 1234 and receive the forwarded message 1248. Moreover, in the current embodiment, the acknowledgment 1250 includes a response to the message as well as a piggybacked acknowledgment. In embodiments where the message 1236 does not invoke a response, the acknowledgment may be sent alone or bundled with other acknowledgments using an acknowledgment timer as previously discussed. Furthermore, in some embodiments, the router 1234 may not store the message 1236. Instead, in such embodiments, the router 1234 merely notifies the destination device 1232 to request a transmission of the message 1236 while the destination device 1232 is in an awakened state.

ii. Throttle Flow

Figure 18:
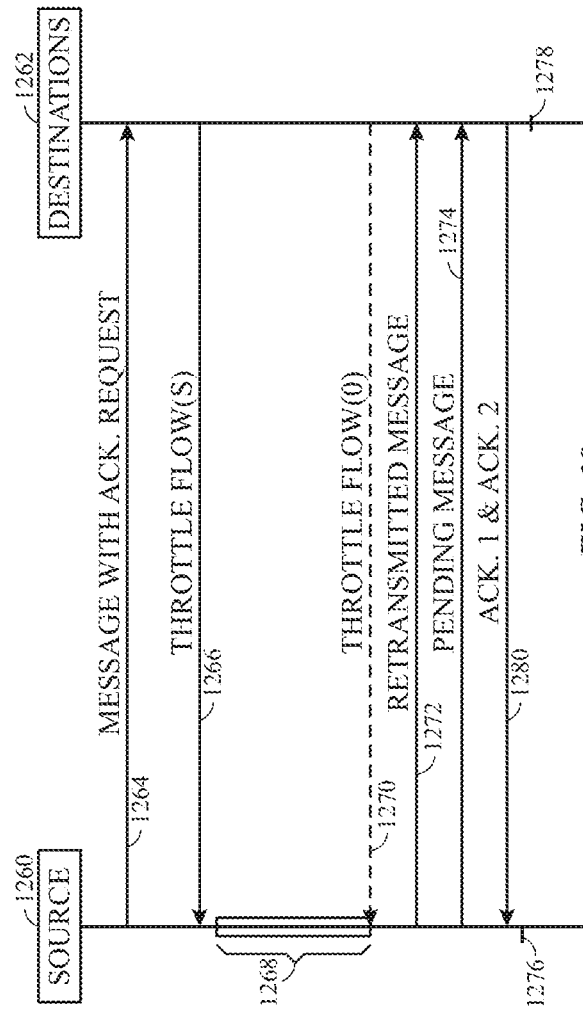
FIG. 18 an exchange of information between a source device and a destination device using reliability functionality including throttle flow commands, in accordance with an embodiment.

As previously discussed, in some scenarios, the destination device may not have any buffer space to receive new messages based on traffic congestion. In such scenarios, the destination device may send a throttle flow message to the sending device. FIG. 18 illustrates an embodiment of an exchange of data between a source device 1260 and a destination device 1262 with throttling. The source device 1260 sends a message with an acknowledgment request to the destination device 1262. Due to congestion or other similar issues, the destination device 1262 sends a throttle flow message 1266 with an estimated throttle time 1268 that represents a period of time after which the issues are estimated to be resolved. As previously discussed, in some embodiments, the estimated time may be cautiously estimated with a tendency to determine a period longer than actually used to reduce the congestion. In some embodiments, the throttle time 1268 may be set much longer than any legitimate estimate of congestion reduction. In such embodiments, a new throttle flow message 1270 with a throttle time of 0 may be sent to inform the source device 1260 that the destination device 1262 is capable of receiving messages again thereby causing the source device 1260 to begin transmitting messages again.

Moreover, during the throttled period running during the throttle time 1268, the source device 1260 does not send any new message. Instead, the source device 1260 queues any new messages during the throttle time 1268. After the throttle time 1268 has elapsed or a new throttle message having a length of 0 is received by the source device 1260, the source device sends a retransmitted message 1272 that is the same as the message 1264. The source device 1260 also sends any queued messages, such as a pending message 1274.

As previously discussed, the source device 1260 starts a retransmit timer when the message 1272 is sent that would elapse at retransmit time 1276. Moreover, in the illustrated embodiment 1264 does not invoke a response from the destination device 1262 (other than an acknowledgment). Accordingly, the destination device 1262 starts an acknowledgment timer waiting to determine if an acknowledgment for the message 1272 may be bundled with any other acknowledgments and/or with a response for the message 1272.

When the acknowledgment timer elapses at an acknowledgment time 1278, the destination device 1262 transmits an acknowledgment even if another acknowledgment is not to be sent. In the illustrated embodiment, since the pending message 1274 is received prior to the acknowledgment time and the pending message 1274 requests acknowledgment, the destination device 1262 may bundle acknowledgment 1 (in response to the message 1272) and acknowledgment 2 (in response to the message 1274) in a single acknowledgment message 1280.

IV. Decision Trees

Figure 19:
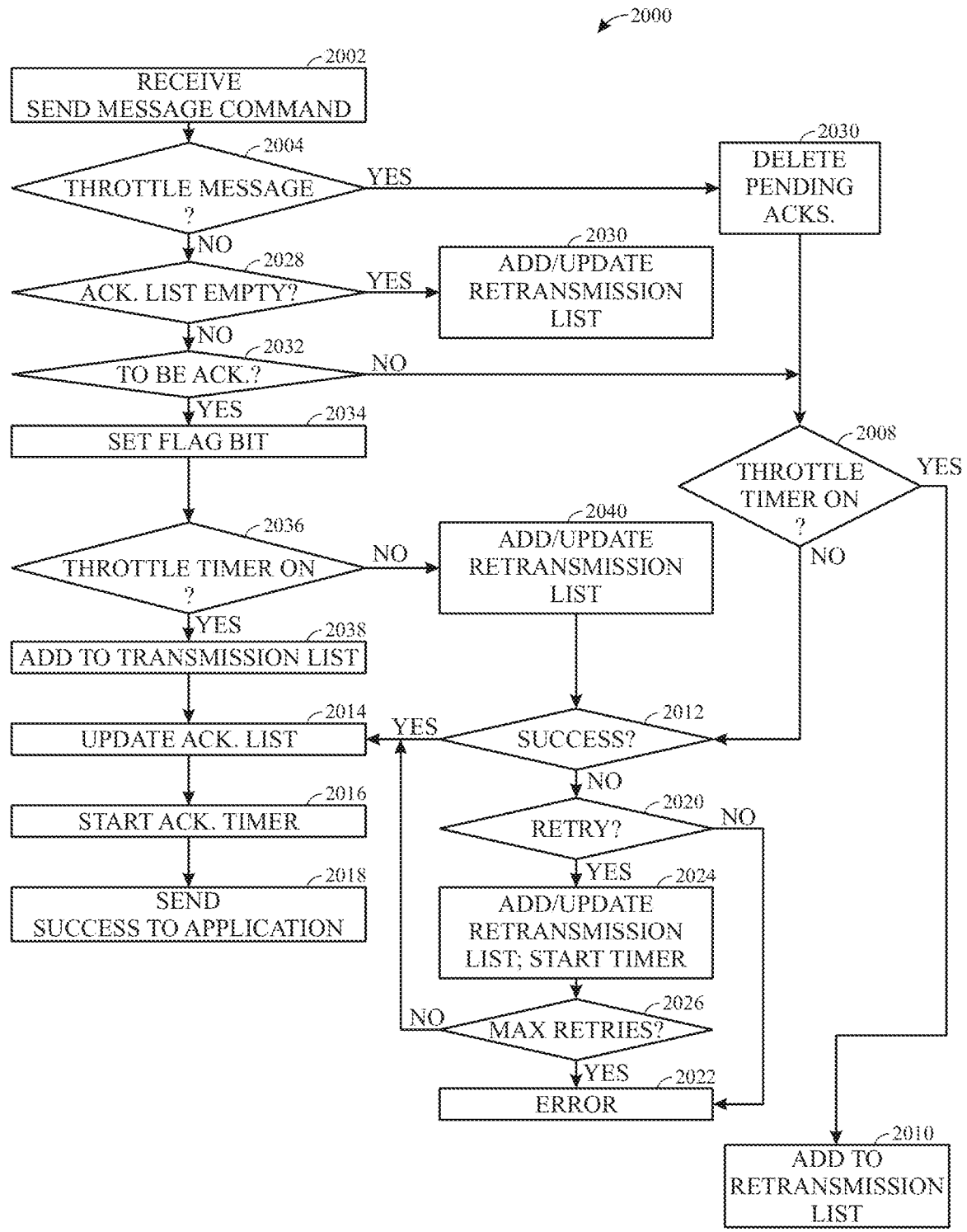
FIG. 19 illustrates a process that may be employed by a source device using reliability functionality, in accordance with an embodiment.

In embodiments that deploy a combination of retransmissions, delayed deliveries, and/or flow throttling, multiple factors affect the determination of when/whether retransmissions or subsequent messages are to be sent a. Send Message FIG. 19 illustrates a flowchart diagram of a process 2000 used by a source device upon receiving a message at a platform and/or network layer from an application program via a higher layer (e.g., the application layer).

The process 2000 begins when the network and/or platform layer receives a send message from the application layer (block 2002). The source device determines whether the message to be sent is a throttle message (block 2004). If the message to be sent is a throttle message, the source device deletes any pending acknowledgments in an attempt to free up buffers in the device and/or traffic congestion (block 2006). After the acknowledgments are deleted from the source device, the source device determines whether a throttle timer is currently running for the exchange (block 2008). If the throttle timer is currently running, the source device adds the throttle message to its retransmission list to be sent when the throttle timer has elapsed or been remotely cleared (block 2010). In some embodiments, the entry for the throttle message in the retransmission list is given a send count value (e.g., 0) to show that the message has not yet been sent. Furthermore, the entry may include a max retries setting that indicates an amount of maximum number of times (e.g., 1) to retransmit the message. In other words, in this scenario, the maximum number of retries is actually a maximum number of tries. If the throttle timer is not on, the source device determines whether the send message is successful (block 2012). In some embodiments, a send message means that the message was successfully sent from the source device and/or to the transport layer without regard to arrival at the destination device.

If the send message is successful, the source device adds the throttle message to its acknowledgment list with messages that request an acknowledgment (block 2014). In some embodiments, throttle flow messages may default to request acknowledgments or to not request acknowledgments since these throttle messages are important, but a received acknowledgment increases congestion at the source device. If the message is added to the acknowledgment list, the source device starts an acknowledgment timer that track how much time has elapsed between sending the message and receive the acknowledgment (block 2016). Regardless of whether the message is added to the acknowledgment request, since the send is successful, indication of success is sent to the application program via the application layer (block 2018).

If the send message for the throttle message is not successfully completed, the source device determines if the error that caused failure is retryable (block 2020). For example, if a temporary error has resolved itself and the message type (e.g., throttle message) is indicated as retryable. If the error is not retryable, an error is returned to the application layer to indicate that the send was not successfully completed and will not be retried (block 2022).

However, if the message is retryable, the message is added to (or an entry for the message is updated in) the source device's retransmission list, and a timer is started for when the retransmission is to begin (block 2024). After the addition/update, the source device determines whether the message has been sent the maximum number of retries for the message (block 2026). If the maximum number of retries has been reached, an error is sent to the application layer. Otherwise, the message is retried.

If the message to be sent is not a throttle control message, the source device determines whether the devices acknowledgment list is empty (block 2028). If a current acknowledgment to be sent is in the acknowledgment list, the source device adds the acknowledgment ID of the entry in the acknowledgment list to the message and removes the entry from the acknowledgment list (block 2030).

The source device then determines whether the message to be sent is to be acknowledged (block 2032). If the message is not to be acknowledged, the message is treated similarly to the throttle message previously discussed starting at block 2008. If the message is not to be acknowledged, the source device sets the acknowledgment flag 1180 (block 2034). After the flag is set, the source device determines whether a throttle timer is running for the source device (block 2036). If the throttle timer is on, the source device adds the message to the retransmission list (block 2038). In some embodiments, since the message has not been sent yet, the send count for the entry in the retransmission list can be set to a value (e.g., 0) that indicates that the message has not yet been sent. If throttle timer is not on, the source device may add the message to the retransmission list or update the entry for the message if the message was already on the list (block 2040). For example, if an attempt has previously been made to send the message, an entry would already exist and the send count for the entry would be incremented.

b. Receive Message

Figure 20:
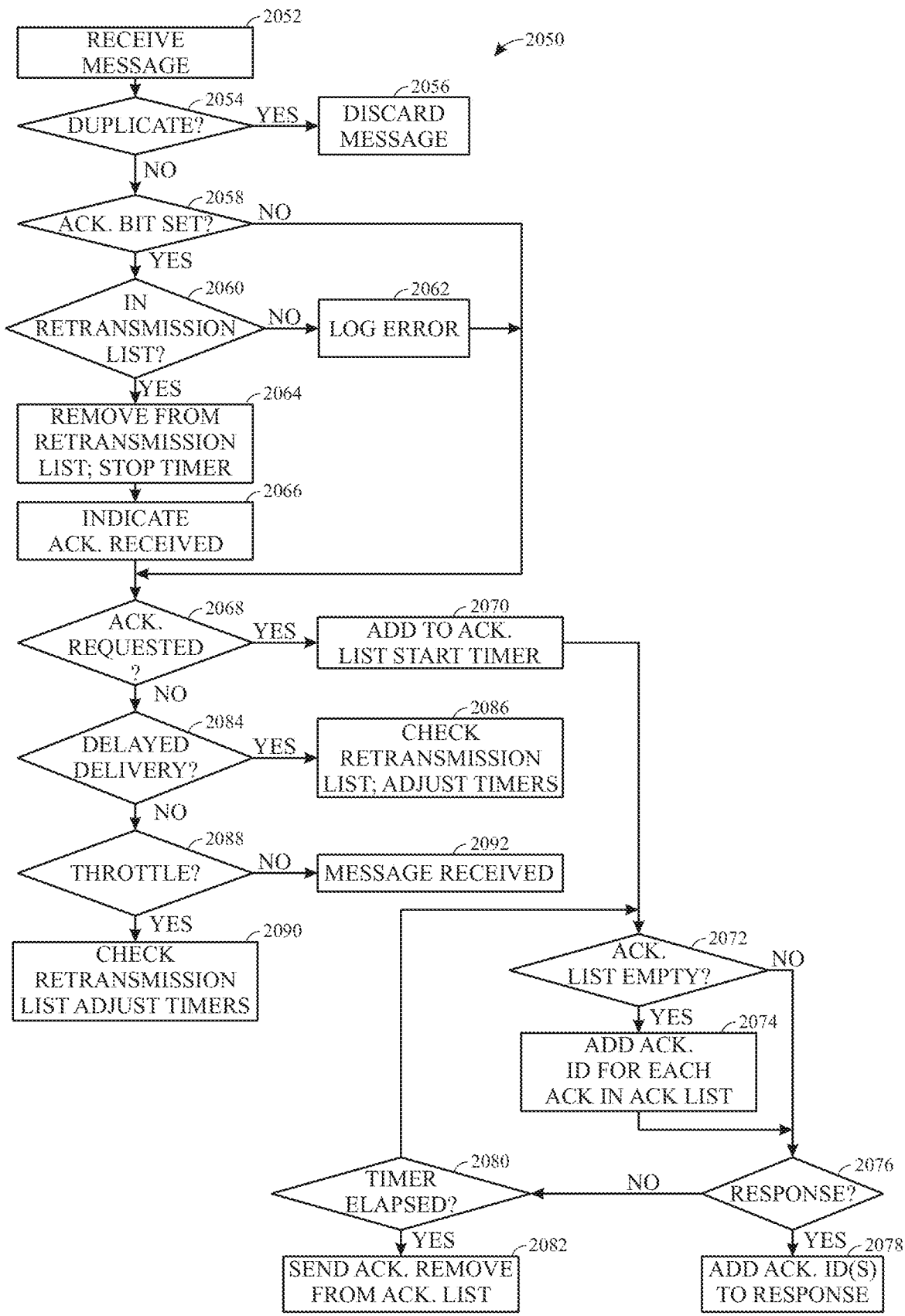
FIG. 20 illustrates a process that may be employed by a destination device using reliability functionality, in accordance with an embodiment.

FIG. 20 illustrates a flowchart diagram of a process 2050 used by a source device upon receiving a message at a platform and/or network layer from a lower layer (e.g., transport layer).

The process 2050 begins when the receiving device receives a message at its network and/or platform layer from a lower layer (block 2052). The receiving device determines whether the message has previously been received (block 2054). In some embodiments, this determination may be performed at a border or parent router. If the message is a duplicate message, the receiving device may discard the message (block 2056). The receiving device then determines whether the message indicates that it includes an acknowledgment by having the acknowledgment flag 1180 is set (block 2058). If acknowledgment flag 1180 is set, the receiving device determines whether a corresponding entry in a retransmission list corresponds to the acknowledgment (block 2060). For example, the receiving device determines whether the acknowledged message ID 1154 in the message matches an entry in the retransmission list. If no corresponding message exists in the retransmission list, an error has occurred. Thus, the receiving device logs the error (block 2062). In some embodiments, the receiving device may store the error, transmit the error back to the sending device, to the service, to a higher layer of the receiving device (e.g., application layer), and/or other suitable actions regarding error histories.

If a corresponding message exists in the retransmission list, the receiving device removes the entry from the retransmission list and stops a retransmission timer (block 2064) and indicates that an acknowledgment has been received (block 2066). For example, the indication of acknowledgment may be sent to an application layer and/or other devices.

The receiving device also determines whether the received message requests an acknowledgment (block 2068). For example, the receiving device may determine whether the acknowledgment request flag 1182 is set in the message. If an acknowledgment is requested in the message, the receiving device adds the message to its acknowledgment list and starts an acknowledgment timer (block 2070). The receiving device may store a message ID in the acknowledgment list to indicate that the message should be acknowledged. The receiving device also determines whether other acknowledgments are present in the acknowledgment list (block 2072).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
   a processor; and
   memory comprising instructions, executable by the processor, to configure the processor to:
   receive, on behalf of a sleepy device that connects to the electronic device using an 802.15.4 network, a message from a remote device destined for the sleepy device, the message comprising a message format that includes:
   an acknowledgment request flag that indicates that the message includes a request to acknowledge the request once received; and an application payload that includes data for the message;
determine whether the sleepy device is in a sleep mode;
if the sleepy device is not in the sleep mode, transmit the message to the sleepy device using the 802.15.4 network; and
if the sleepy device is in the sleep mode:
in response to the reception of the message, transmit a delay delivery request to the remote device that is effective to direct the remote device to delay retransmissions of the message until a period where the sleepy device is not in the sleep mode, the delay delivery request including a value that reflects a sleep duration of the sleep mode for the sleepy, the delay delivery request adding the value to a retransmission threshold for a retransmission timer at the remote device to cause the remote device to delay retransmission of the message until the retransmission timer has reached a delayed threshold that is a combination of the retransmission threshold and the value, and the retransmission threshold being a value reflecting how often retransmissions are to be sent; and
store the message as a held message to be delivered to the sleepy device when it awakens from the sleep mode.

2. The electronic device of claim 1, wherein the instructions configure the processor to:
receive a message poll from the sleepy device when the sleepy device awakens from the sleep mode; and
if any held messages were received during the sleep mode of the sleepy device, transmit the held messages to the sleepy device.

3. The electronic device of claim 2, wherein the instructions configure the processor to:
during the sleep mode of the sleepy device, determine if the message is a duplicate of a previously received message destined for the sleepy device using a common message identifier present in the message and the previously received message, and wherein the transmission of the held messages comprises sending a single copy of the message instead of duplicate held messages.

4. The electronic device of claim 1, wherein the instructions configure the processor to:
receive an acknowledgment message for the message from the sleepy device destined for the remote device; and
forward the acknowledgment message to the remote device from the sleepy device.

5. The electronic device of claim 1, wherein the message is received over a relatively low power communication protocol.

6. The electronic device of claim 1, wherein the electronic device is a border router.

7. A method of managing messages for sleepy devices by an electronic device, the method comprising the electronic device:
receiving, on behalf of a sleepy device that connects to the electronic device using an 802.15.4 network, a message from a remote device destined for the sleepy device, the message comprising a message format that includes:
an acknowledgment request flag that indicates that the message includes a request to acknowledge the request once received; and
an application payload that includes data for the message;
determining whether the sleepy device is in a sleep mode;
if the sleepy device is not in the sleep mode, transmitting the message to the sleepy device using the 802.15.4 network; and
if the sleepy device is in the sleep mode:
in response to the receiving the message, transmitting a delay delivery request to the remote device that is effective to direct the remote device to delay retransmissions of the message until a period where the sleepy device is not in the sleep mode, the delay delivery request including a value that reflects a sleep duration of the sleep mode for the sleepy device, the delay delivery request adding the value to a retransmission threshold for a retransmission timer at the remote device to cause the remote device to delay retransmission of the message until the retransmission timer has reached a delayed threshold that is a combination of the retransmission threshold and the value, and the retransmission threshold being a value reflecting how often retransmissions are to be sent; and
storing the message as a held message to be delivered to the sleepy device when it awakens from the sleep mode.

8. The method of claim 7, the method further comprising the electronic device:
receiving a message poll from the sleepy device when the sleepy device awakens from the sleep mode; and
if any held messages were received during the sleep mode of the sleepy device, transmitting the held messages to the sleepy device.

9. The method of claim 8, the method further comprising the electronic device:
during the sleep mode of the sleepy device, determining if the message is a duplicate of a previously received message destined for the sleepy device using a common message identifier present in the message and the previously received message, and wherein the transmitting the held messages comprises sending a single copy of the message instead of duplicate held messages.

10. The method of claim 7, the method further comprising the electronic device:
receiving an acknowledgment message for the message from the sleepy device destined for the remote device; and
forwarding the acknowledgment message to the remote device from the sleepy device.

11. The method of claim 7, wherein the message is received over a relatively low power communication protocol.

12. The method of claim 7, wherein the electronic device is a border router.

13. A non-transitory, computer-readable medium comprising instructions, executable by a processor of an electronic device, to configure the electronic device to:
receive, on behalf of a sleepy device that connects to the electronic device using an 802.15.4 network, a message from a remote device destined for the sleepy device, the message comprising a message format that includes:
an acknowledgment request flag that indicates that the message includes a request to acknowledge the request once received; and
an application payload that includes data for the message;

determine whether the sleepy device is in a sleep mode;

if the sleepy device is not in the sleep mode, transmit the message to the sleepy device using the 802.15.4 network; and if the sleepy device is in the sleep mode:
  in response to the reception of the message, transmit a delay delivery request to the remote device that is effective to direct the remote device to delay retransmissions of the message until a period where the sleepy device is not in the sleep mode, the delay delivery request including a value that reflects a sleep duration of the sleep mode for the sleepy device, the delay delivery request adding the value to a retransmission threshold for a retransmission timer at the remote device to cause the remote device to delay retransmission of the message until the retransmission timer has reached a delayed threshold that is a combination of the retransmission threshold and the value, and the retransmission threshold being a value reflecting how often retransmissions are to be sent; and
  store the message as a held message to be delivered to the sleepy device when it awakens from the sleep mode.

14. The non-transitory, computer-readable medium of claim 13, wherein the instructions are executable by the processor to configure the electronic device to:
  receive a message poll from the sleepy device when the sleepy device awakens from the sleep mode; and
  if any held messages were received during the sleep mode of the sleepy device, transmit the held messages to the sleepy device.

15. The non-transitory, computer-readable medium of claim 14, wherein the instructions are executable by the processor to configure the electronic device to:
  during the sleep mode of the sleepy device, determine if the message is a duplicate of a previously received message destined for the sleepy device using a common message identifier present in the message and the previously received message, and wherein the transmission of the held messages comprises sending a single copy of the message instead of duplicate held messages.

16. The non-transitory, computer-readable medium of claim 13, wherein the instructions are executable by the processor to configure the electronic device to:
  receive an acknowledgment message for the message from the sleepy device destined for the remote device; and
  forward the acknowledgment message to the remote device from the sleepy device.

17. The non-transitory, computer-readable medium of claim 13, wherein the message is received over a relatively low power communication protocol.

18. The non-transitory, computer-readable medium of claim 17, wherein the relatively low power communication protocol comprises a protocol that transmits packets of data as datagrams between the electronic device and one or more remote devices.

19. The electronic device of claim 5, wherein the relatively low power communication protocol comprises a protocol that transmits packets of data as datagrams between the electronic device and one or more remote devices.

20. The method of claim 11, wherein the relatively low power communication protocol comprises a protocol that transmits packets of data as datagrams between the electronic device and one or more remote devices.

* * * * *